(12) United States Patent
Noshadi et al.

(10) Patent No.: US 11,605,508 B2
(45) Date of Patent: Mar. 14, 2023

(54) BIO-IONIC LIQUID HYDROGELS AND USE OF SAME

(71) Applicant: Rowan University, Glassboro, NJ (US)

(72) Inventors: Iman Noshadi, Haddon Heights, NJ (US); Vaishali Krishnadoss, Glassboro, NJ (US)

(73) Assignee: Rowan University, Glassboro, NJ (US)

( * ) Notice: Subject to any disclaimer, the term of this patent is extended or adjusted under 35 U.S.C. 154(b) by 160 days.

(21) Appl. No.: 17/045,300

(22) PCT Filed: Apr. 8, 2019

(86) PCT No.: PCT/US2019/026366
§ 371 (c)(1),
(2) Date: Oct. 5, 2020

(87) PCT Pub. No.: WO2019/195843
PCT Pub. Date: Oct. 10, 2019

(65) Prior Publication Data
US 2021/0151263 A1    May 20, 2021

Related U.S. Application Data

(60) Provisional application No. 62/653,638, filed on Apr. 6, 2018.

(51) Int. Cl.
| | |
|---|---|
| *H01G 11/56* | (2013.01) |
| *H01G 11/36* | (2013.01) |
| *H01G 11/38* | (2013.01) |
| *H01G 11/86* | (2013.01) |
| *H01G 11/26* | (2013.01) |

(52) U.S. Cl.
CPC ............. *H01G 11/56* (2013.01); *H01G 11/36* (2013.01); *H01G 11/38* (2013.01); *H01G 11/86* (2013.01); *H01G 11/26* (2013.01)

(58) Field of Classification Search
CPC ........ H01G 11/56; H01G 11/36; H01G 11/38; H01G 11/86; H01G 11/26
See application file for complete search history.

(56) References Cited

U.S. PATENT DOCUMENTS

| | | |
|---|---|---|
| 6,337,156 B1 | 1/2002 | Narang |
| 2008/0039904 A1 | 2/2008 | Bulkes |
| 2013/0180912 A1* | 7/2013 | Li .......................... C01B 32/192 |
| | | 428/221 |

(Continued)

FOREIGN PATENT DOCUMENTS

| | | |
|---|---|---|
| WO | 2017117467 A1 | 7/2017 |

OTHER PUBLICATIONS

Guiseppi-Elie, A. Electroconductive hydrogels: synthesis, characterization and biomedical applications. Biomaterials 31, 2701-2716, doi:10.1016/j.biomaterials.2009.12.052 (2010).

(Continued)

*Primary Examiner* — Dion R. Ferguson
(74) *Attorney, Agent, or Firm* — Saul Ewing LLP; Domingos J. Silva; Dennis Ostrovsky

(57) ABSTRACT

The present invention relates in part to a polymer functionalized with a bio-ionic liquid to form a gel electrolyte. The gel electrolyte thus formed is biocompatible and biodegradable. In certain embodiments, the electrolyte is used for making implantable 3D printed energy storage devices.

17 Claims, 28 Drawing Sheets

Graphene Hydrogel

+

LAPONITE

Graphene Hydrogel-LAPONITE Composite ( GH-L)
ELECTRODE

(56) References Cited

U.S. PATENT DOCUMENTS

| | | | |
|---|---|---|---|
| 2016/0126558 A1* | 5/2016 | Lewis | H01M 4/0411 264/447 |
| 2016/0284481 A1* | 9/2016 | Duan | H01G 11/24 |
| 2017/0346129 A1* | 11/2017 | Stolyarov | H01M 4/485 |
| 2018/0355194 A1* | 12/2018 | Yadavalli | H01G 11/36 |
| 2020/0353156 A1* | 11/2020 | Noshadi | A61L 27/08 |
| 2021/0151263 A1* | 5/2021 | Noshadi | H01G 11/38 |

OTHER PUBLICATIONS

Yue, K. et al. Synthesis, properties, and biomedical applications of gelatin methacryloyl (GelMA) hydrogels. Biomaterials 73, 254-271, doi:10.1016/j.biomaterials.2015.08.045 (2015).

Klein, R. et al. Biodegradability and cytotoxicity of choline soaps on human cell lines: effects of chain length and the cation. Rsc Adv 3, 23347-23354, doi:10.1039/c3ra42812e (2013).

Ullah, F., et al., Classification, processing and application of hydrogels: A review. Mater Sci Eng C Mater Biol Appl 57, 414-433, doi:10.1016/j.msec.2015.07.053 (2015).

Wu, Y. et al. Fabrication of conductive gelatin methacrylate-polyaniline hydrogels. Acta biomaterialia 33, 122-130, doi:10.1016/j.actbio.2016.01.036 (2016).

Guo, B. L., et al., Biodegradable and electrically conducting polymers for biomedical applications. Prog Polym Sci 38, 1263-1286, doi:10.1016/j.progpolymsci.2013.06.003 (2013).

Green, R. A. et al. Conductive Hydrogels: Mechanically Robust Hybrids for Use as Biomaterials. Macromol Biosci 12, 494-501, doi:10.1002/mabi.201100490 (2012).

Mihic, A. et al. A Conductive Polymer Hydrogel Supports Cell Electrical Signaling and Improves Cardiac Function After Implantation into Myocardial Infarct. Circulation 132, 772-784, doi:10.1161/Circulationaha.114.014937 (2015).

Balint, R., et al., Electrical Stimulation: A Novel Tool for Tissue Engineering. Tissue Eng Part B-Re 19, 48-57, doi:10.1089/ten.teb.2012.0183 (2013).

Y. J. Kim, et al., Proc. Natl. Acad. Sci. USA 2013, 110, 20912.

Wang, X. et al. Flexible energy-storage devices: design consideration and recent progress. Adv. Mater. 26, 4763-4782 (2014).

Park, S. et al. Hydrazine-reduction of graphite- and graphene oxide. Carbon 49, 3019-3023 (2011).

Simon, P., et al., Where do batteries end and supercapacitors begin? Science 343, 1210-1211 (2014).

Zhou, T., et al., Poly(ionic liquid) hydrogels exhibiting superior mechanical and electrochemical properties as flexible electrolytes. J. Mater. Chem. A 4, 1112-1118 (2016).

Yoshizawa, M., et al., Ion conduction in zwitterionic-type molten salts and their polymers. J. Mater. Chem. 11, 1057-1062 (2001).

Peng, X., et al., Two dimensional nanomaterials for flexible supercapacitors. Chem. Soc. Rev. 43, 3303-3323 (2014).

Jia, et al., "Biocompatible ionic liquid-biopolymer electrolyte enabled thin and compact magnesium air batteries", ACS, Applied Materials & Interfaces, vol. 6(23), retrieved online from https://ro.uow.edu.au/cgi/viewcontent.cgi?article=2294&context=aiimpapers on Jun. 10, 2019, 2014, pp. 1-23.

Zhao, et al., "Composites of Polymer Hydrogels and Nanoparticulate Systems for Biomedical and Pharmaceutical Applications", Nanomaterials, vol. 5, 2015, pp. 2054-2130.

International Search Report and Written Opinion dated Jun. 27, 2019 for corresponding PCT International Application PCT/US19/26366.

\* cited by examiner

FIG. 5A
FIG. 5B
FIG. 5C
FIG. 5D
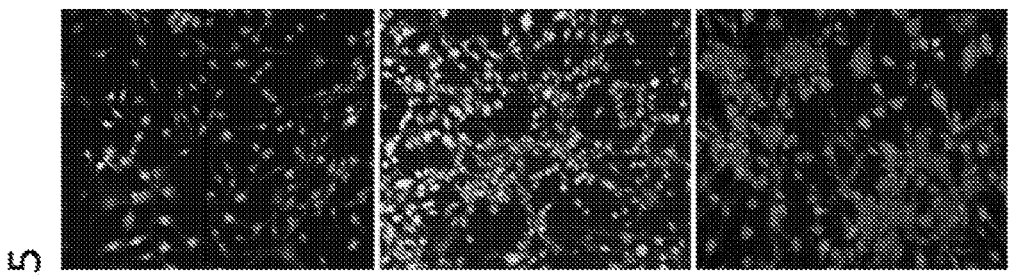
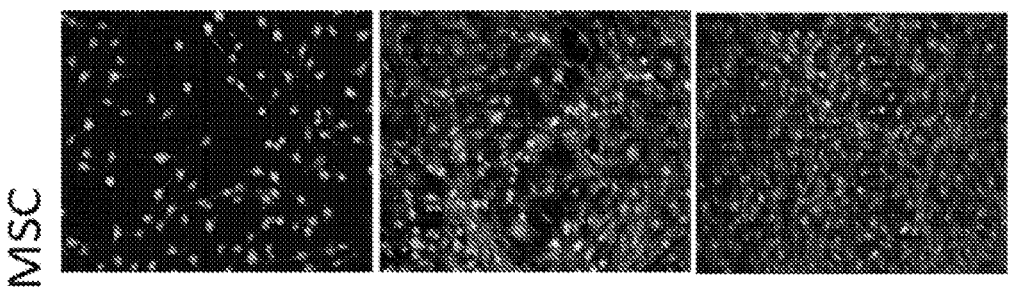
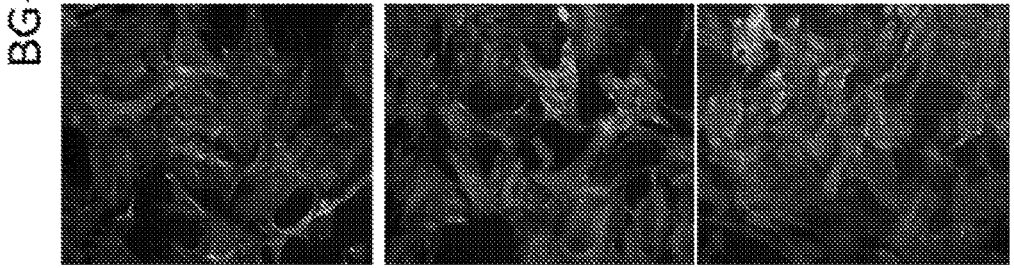

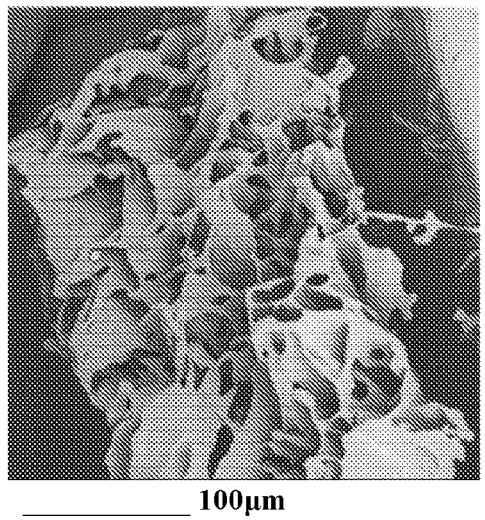
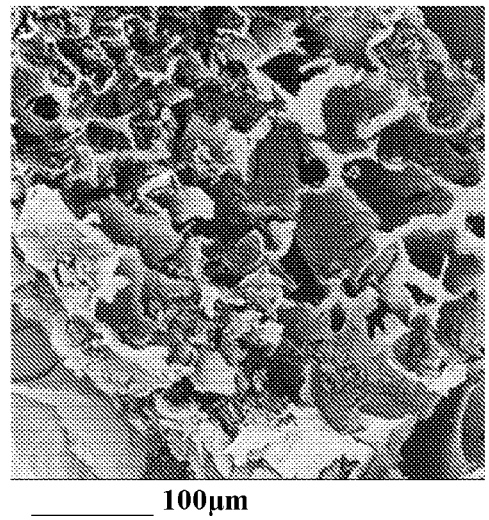
FIG. 7C
FIG. 7D
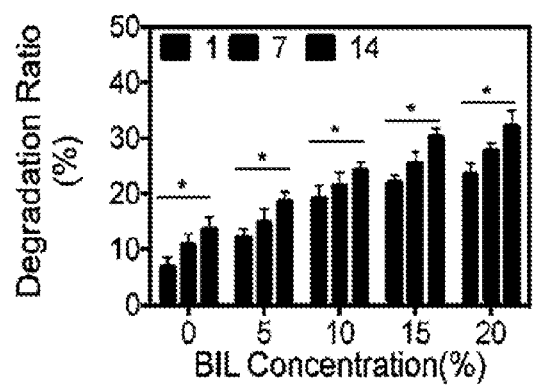
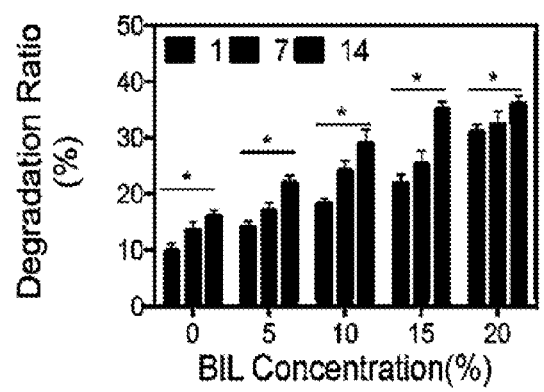
FIG. 8A
FIG. 8B

BIO-IONIC LIQUID HYDROGELS AND USE OF SAME

CROSS-REFERENCE TO RELATED APPLICATIONS

The present application is a 35 U.S.C. § 371 national stage application from, and claims priority to, International Application No. PCT/US2019/026366, filed Apr. 8, 2019, which claims priority under 35 U.S.C. § 119(e) to U.S. Provisional Application No. 62/653,638, filed Apr. 6, 2018, all of which are hereby incorporated by reference herein in their entireties.

BACKGROUND OF THE INVENTION

The increasing demand for wearable and biocompatible electronic devices has driven tremendous research effort on the design and fabrication of electronics in microscale. To ensure functionality and reliability, microdevices should be integrated with independent and internal energy storage systems to avoid frequent charging process from external sources. Between many power source systems, the supercapacitor has been considered as an implantable electric energy source due to benefits such as a long cycle life, a high-power density, and fast charge-discharge rate within seconds.

Miniaturization, biocompatibility, and biodegradability are the primary keys to achieving the requisites for implantable supercapacitors. Conventionally, fabrication techniques such as lithography or transfer masks for obtaining patterned architectures are cumbersome and economically expensive. Thus, it is imperative to develop simple and cost-effective fabrication techniques with high throughput and without the requirement of masks and moulds. The fabrication techniques should not require additional processing or complicated methodologies for producing micro-devices.

Furthermore, several materials used as solid-state supercapacitors suffer from limitations such as cytotoxicity, processability, and undesirable side reaction, thus making them inadequate for biomedical applications.

There is a need for developing a biocompatible and biodegradable ion conductive electrolytes platform where the conductive entity is built into the electrolyte structure using simple, non-harsh conditions employing only biocompatible elements. The present invention meets this need.

BRIEF SUMMARY OF THE INVENTION

In one aspect, the invention provides an energy storage device comprising electrodes comprising a graphene gel. In certain embodiments, at least one of the electrodes is in electrochemical contact with a gel electrolyte comprising a polymer functionalized with a bio-ionic liquid (BIL), wherein the polymer comprises gelatin methacrylate (GelMa) or poly(ethylene glycol) diacrylate (PEGDA).

In another aspect, the invention further provides a method of forming the energy storage device of the invention.

BRIEF DESCRIPTION OF THE FIGURES

For the purpose of illustrating the invention, depicted in the drawings are certain embodiments of the invention. However, the invention is not limited to the precise arrangements and instrumentalities of the embodiments depicted in the drawings.

FIG. 1E shows fabrication of biopolymer hydrogel into implantable energy storage device. FIG. 1F shows fabrication of micro-supercapacitor, where BG-MSC or BP-MSC is the electrolyte and graphene hydrogel laponite (GH-L) composite is the electrode forming an interdigitate structure by 3D printing using ALLEVI 2 printer.

FIG. 2F shows Tafel plot.

FIG. 3A shows CV of BG-15 and BP-15 electrolyte and GH-L as working electrode and Ag/AgCl as reference electrode at scan rates 200 mV/s with a voltage window 1V. FIG. 3B shows volumetric capacitance of BG-15 and BP-15 at different scan rate (10-200 mV/s). FIG. 3C shows a Ragone plot comparing the performance of BG-15 and BP-15 with different energy storage devices—data for the other devices are reproduced from the references. FIG. 3D shows galvanostatic charge/discharge curve of BG-15 and BP-15 before and after polymerization.

FIG. 4A is an image showing the printing process, additive printing of the energy storage device. FIG. 4B shows prints of various sizes of BG-15. FIG. 4C shows prints of various sizes of BP-15. FIG. 4D is a graph showing rheology of BG-15 and BP-15. FIG. 4E shows cyclic voltammetry curve with a voltage window of 0.1V of the printed BG-15 supercapacitor, and FIG. 4F shows a specific capacitance of printed device with varying interdigitation and size.

FIGS. 5A-5G illustrate in vitro biocompatibility of BG-15 and BG-MSC. Representative live/dead images and F-Actin/DAPI fluorescent images at days 1, 4 and 7 post seeding of BG-15 (FIGS. 5A-5B) and BG-MSC (FIGS. 5C-5D). Quantification of metabolic activity, relative fluorescence units (RFU), using PrestoBlue assay is shown in FIG. 5E. Quantification of cell viability of live/dead images is shown in FIG. 5F. Quantification of cell proliferation based on DAPI-stained cell nuclei is shown in FIG. 5G.

FIGS. 6A-6D are images for Hematoxylin and eosin (H&E) staining of printed device and surrounding tissue after control (FIG. 6A), 4 days (FIG. 6B), 14 days (FIG. 6C), and 28 days (FIG. 6D) days of implantation. FIGS. 6E-6H show fluorescent immunohistochemical analysis, macrophage (CD68) presence control (FIG. 6E), 4 days (FIG. 6F), 14 days (FIG. 6G), and 28 days (FIG. 6H) days counterstained with nuclei (DAPI). FIGS. 6I and 6J are images of the implanting the supercapacitor subcutaneously.

Figures 6A, 6B, 6C, 6D:
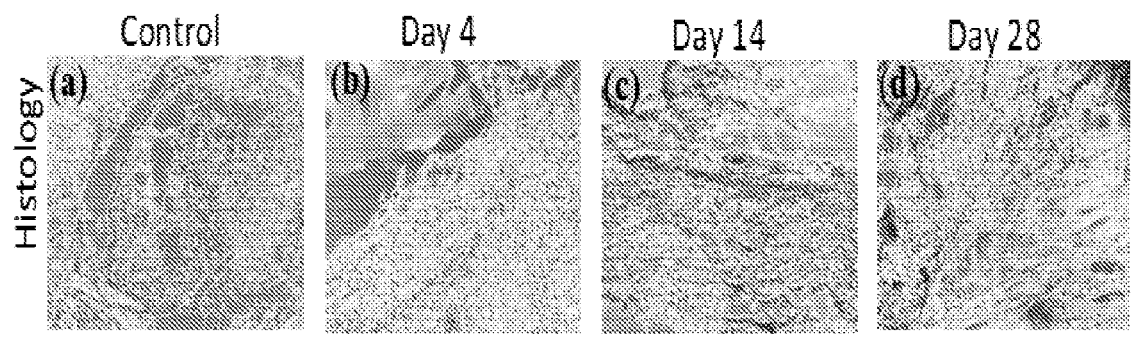
FIGS. 6A-6K illustrate in vivo biocompatibility and degradation of BG-MSC.
Figures 6E, 6F, 6G, 6H:
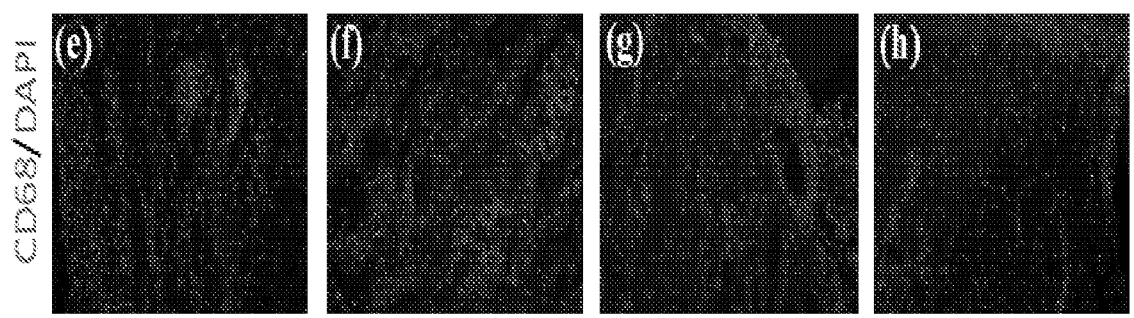
Figures 6I, 6J, 6K:
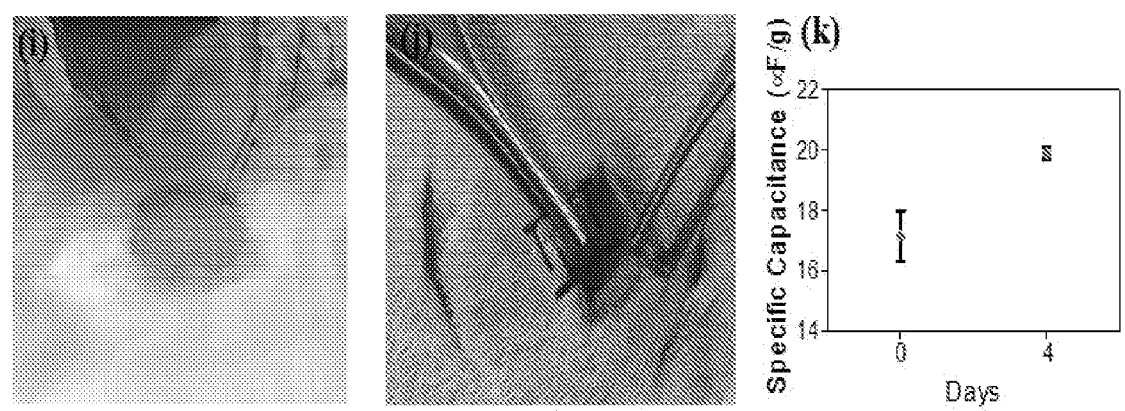
Figure 7A:
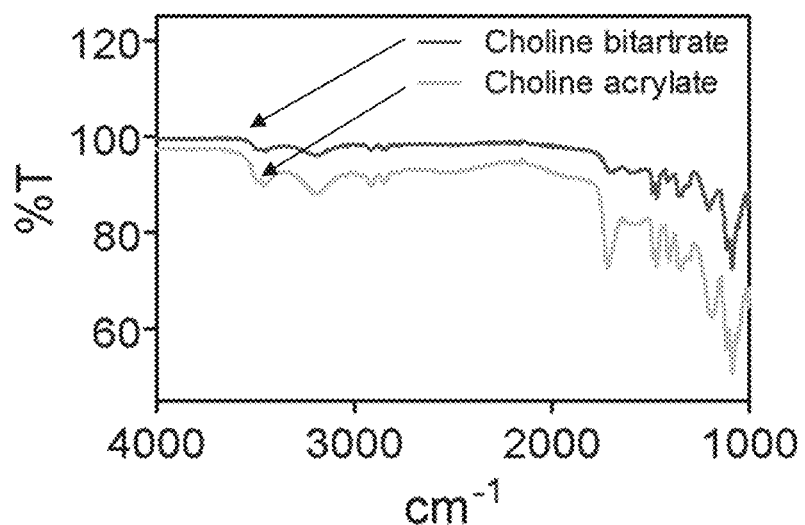
Figure 7B:
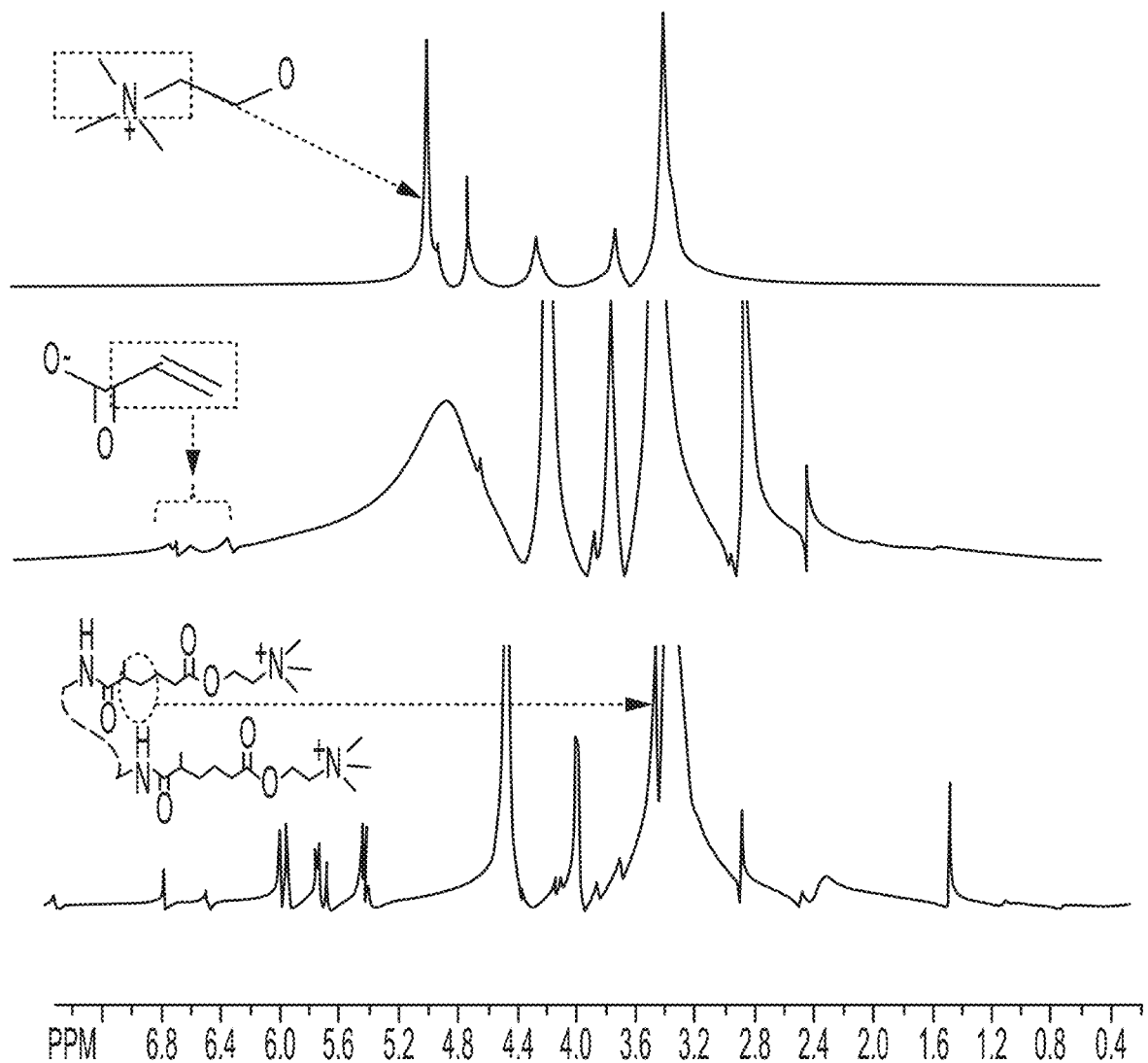

Specific capacitance of the printed device before and at day 4 after implantation is plotted in FIG. 6K.

FIGS. 7A-7D show synthesis and characterization of bio-ionic liquid (BIL) and BIL-functionalized polymer (BG) hydrogel. The panels show FITR (FIG. 7A) and $^1$H-NMR (FIG. 7B) analysis of choline bitartrate, BIL, and BG. BG was synthesised in presence of visible light 405 nm at an intensity of 10 mW/cm$^2$ for 60 secs and lithium phenyl-2,4,6-trimethylbenzoylphosphinate (LAP) as a photo initiator. SEM images of the GelMA (FIG. 7C) and BG (FIG. 7D) provide insight into the porosity of the polymer.

Figure 8C:
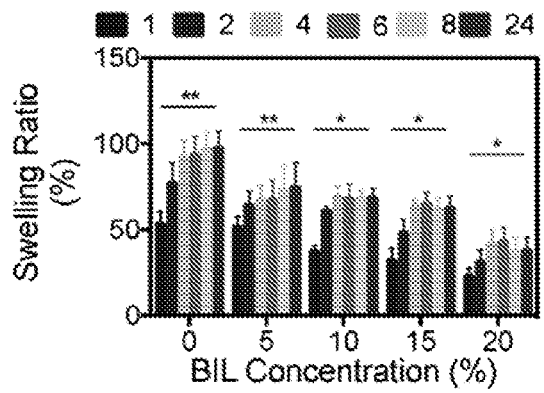
Figure 8D:
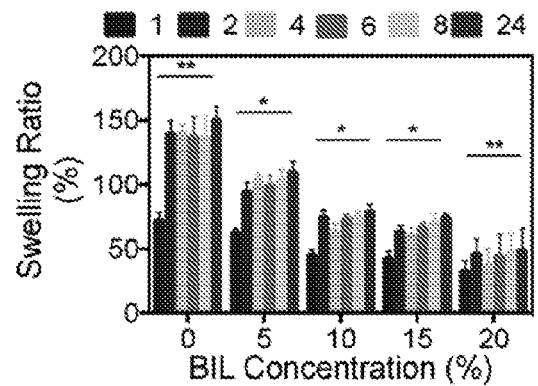
Figure 8E:
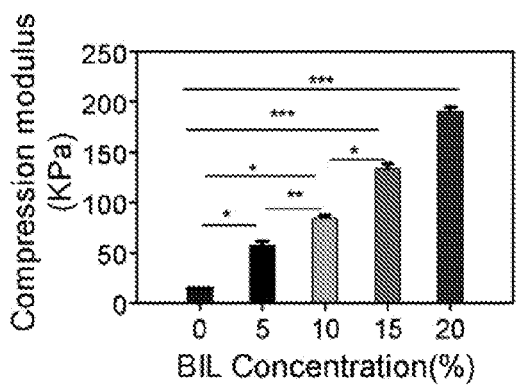
Figure 8F:
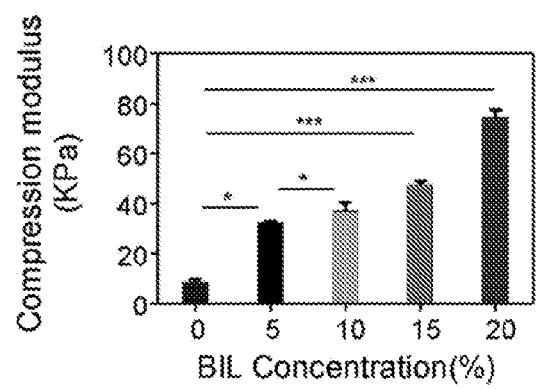
Figure 8G:
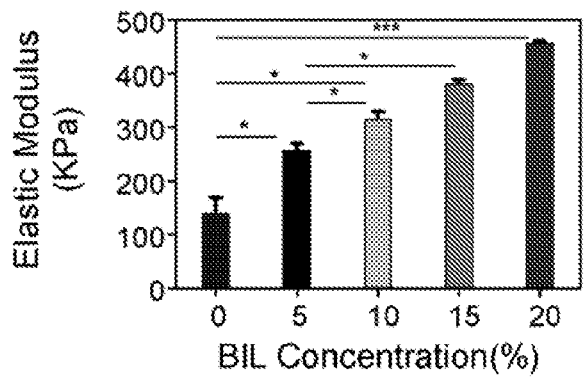
Figure 8H:
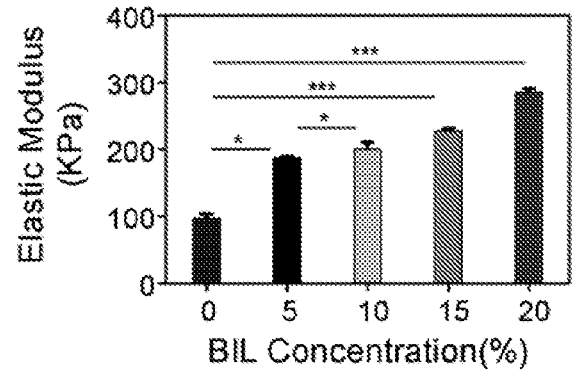

FIGS. 8A-8H are graphs showing in vitro swelling, degradation, and mechanical properties of polymer/BIL hydrogels prepared by polymerization using photo-initiator and UV light. Degradation profiles of 20% (w/v) GelMA (FIG. 8A) with varying concentration of BIL and 20% (w/v) PEGDA (FIG. 8B) with varying concentration of BIL in DPBS over a two-week period are shown. Swelling ratios of 20% (w/v) GelMA (FIG. 8C) with varying concentration of BIL and 20% (w/v) PEGDA (FIG. 8D) with varying concentration of BIL in DPBS after 1, 2, 4, 6, 8 and 24 h are shown. Mechanical properties of 20(w/v)% polymer with varying concentration of BIL [0-20% (w/v)] are shown: Compression Modulus of BG (FIG. 8E) and BP (FIG. 8F); Elastic Modulus of BG (FIG. 8G) and BP (FIG. 8H). Error bars indicate standard error of the means, asterisks mark significance levels of $p<0.05$ (*), $p<0.01$ (), and $p<0.001$ (*).

Figure 9A:
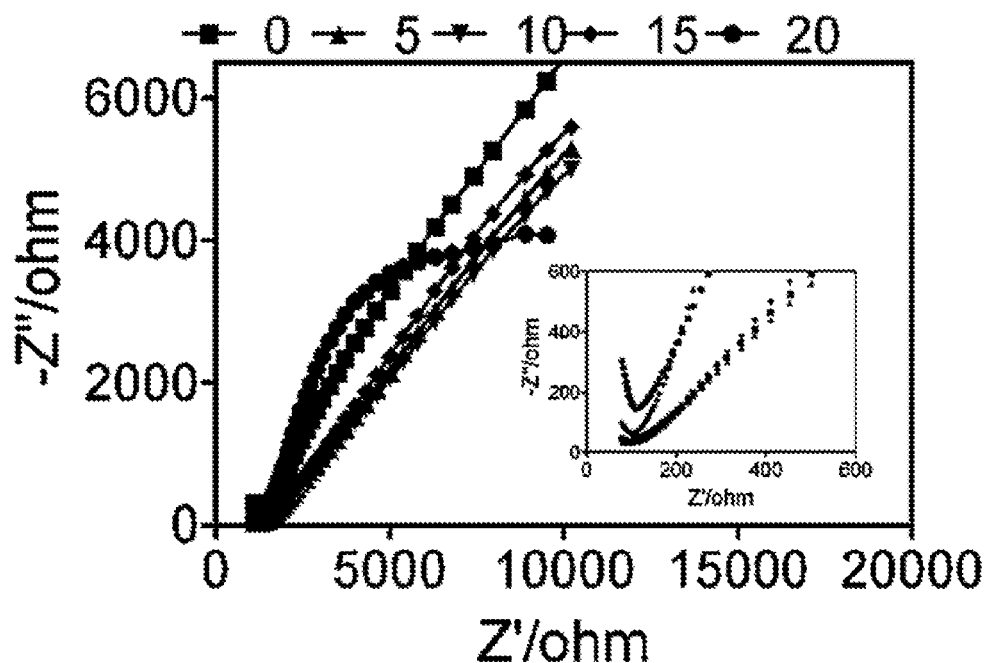
Figure 9B:
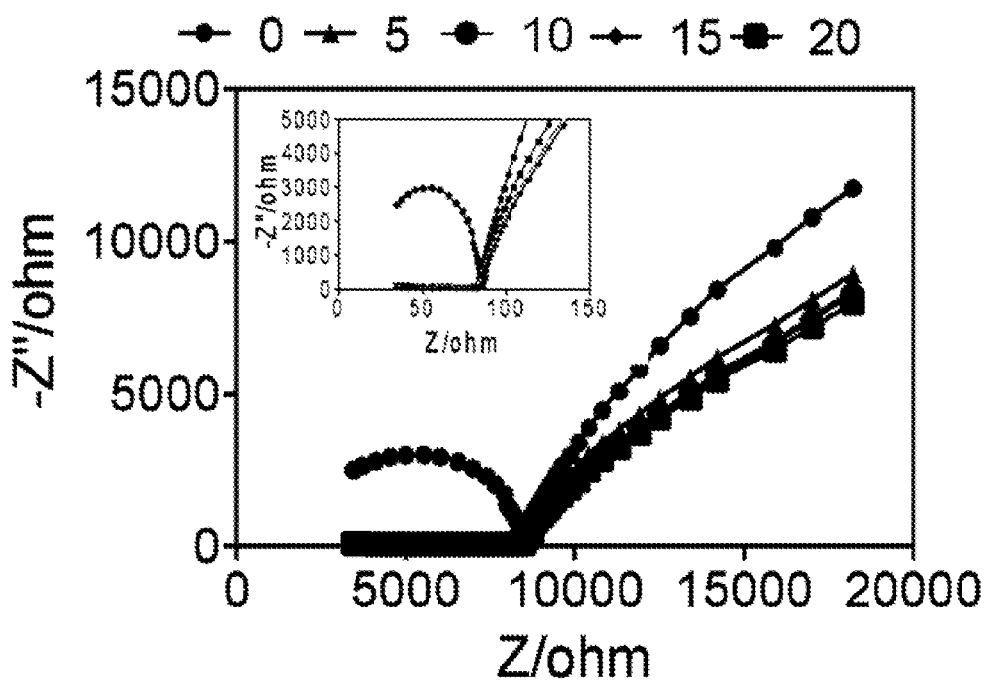
Figure 9C:
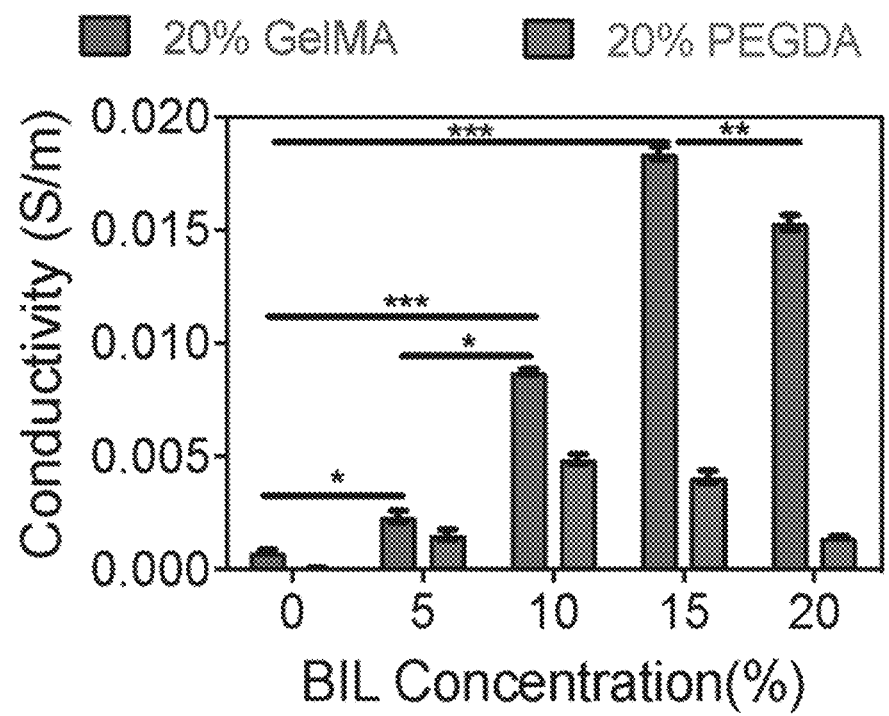
Figure 9D:
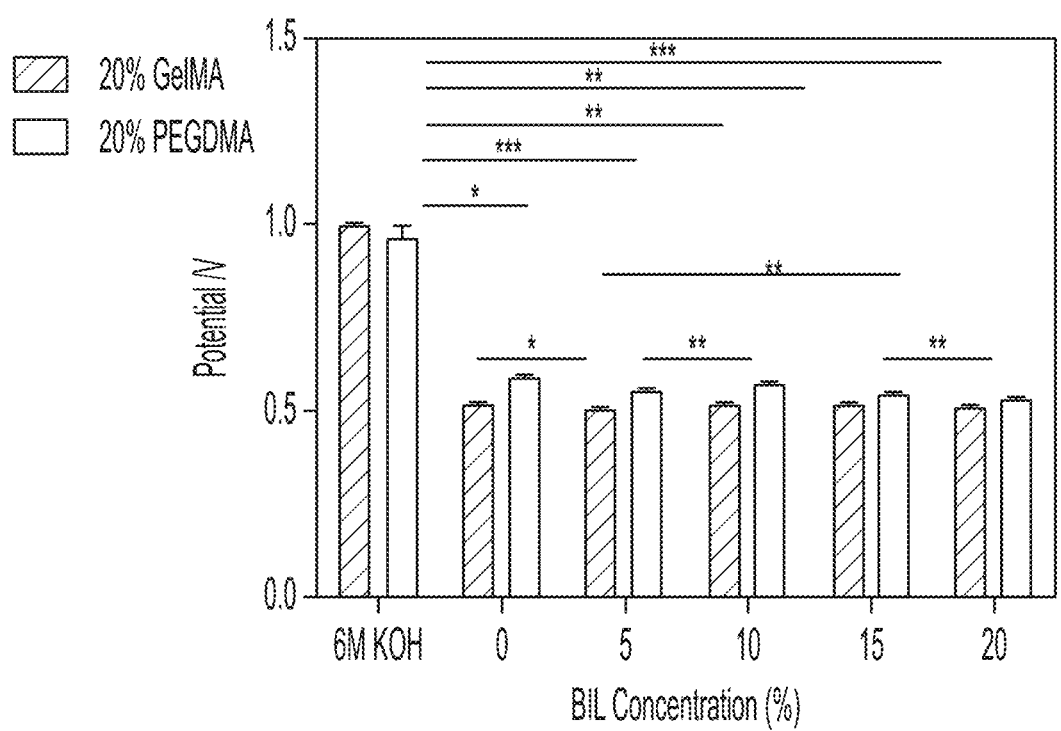

FIGS. 9A-9D show electrochemical impedance spectroscopy (EIS) of the polymer electrolyte with glassy carbon electrode at 0.1V. Nyquist plots of 20 wt % GelMA (FIG. 9A) with varying concentration of BIL (inset shows the high-frequency regions) and of 20 wt % PEGDA (FIG. 9B) with varying concentration of BIL are shown. FIG. 9C shows calculated conductivity of the polymer electrolytes. FIG. 9D is a graph showing potential with varying BIL concentration for 20 wt % GelMA and 20 wt % PEGDA.

Figure 10A:
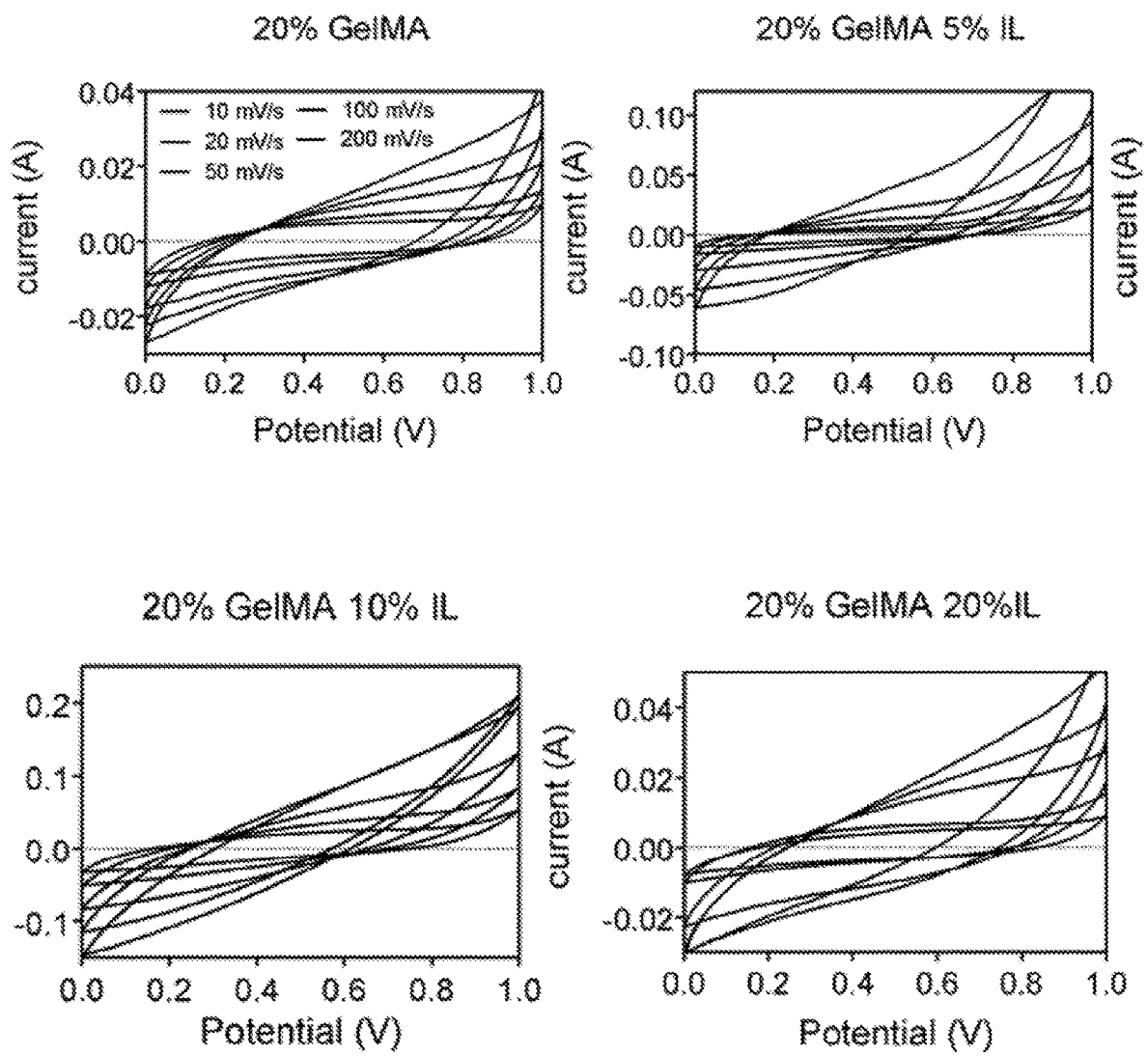
Figure 10B:
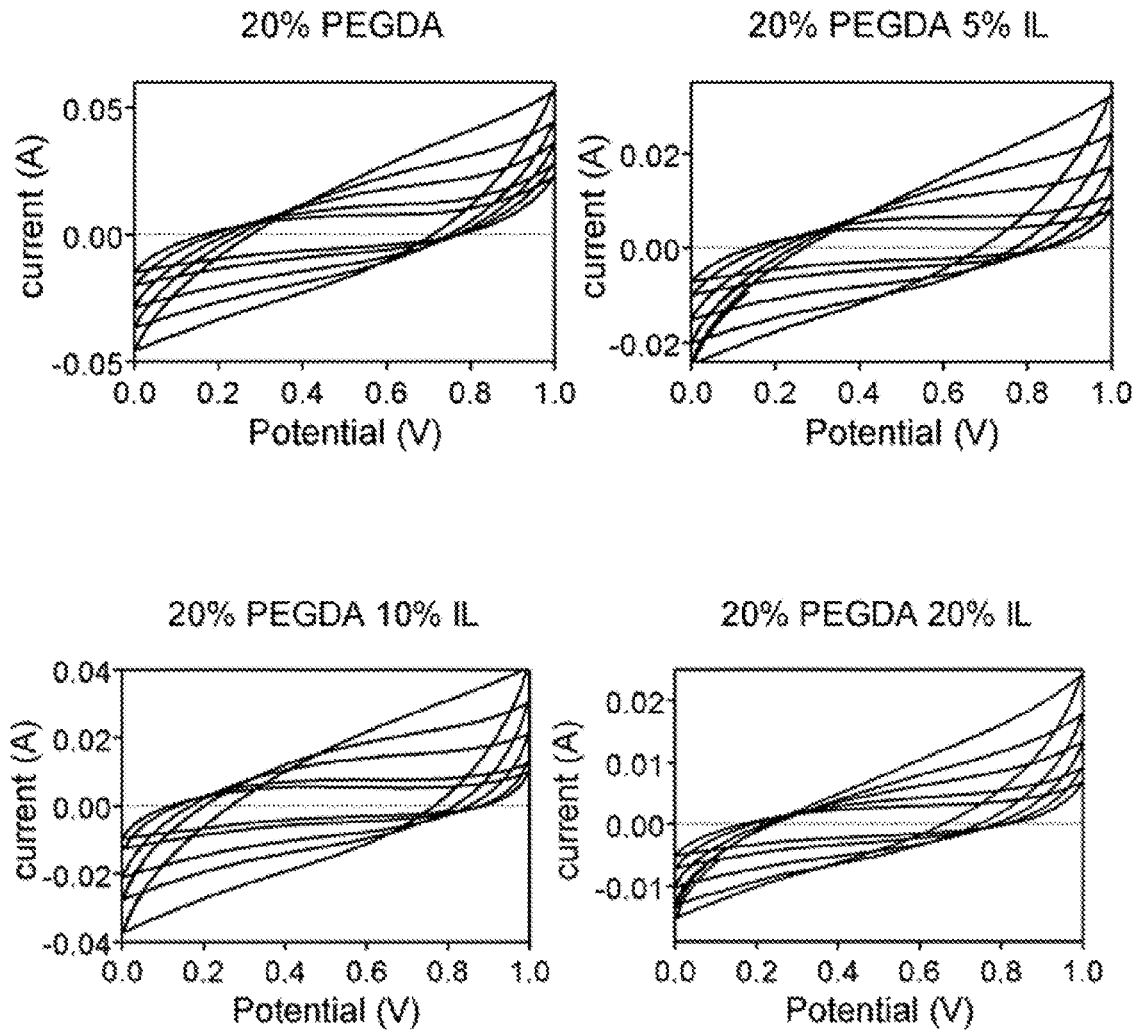

FIGS. 10A-10B show cyclic voltammetry polymer electrolyte with graphene h as working electrode at different scan rate (10-200 mV/s) for 20% (w/v) GelMA (FIG. 10A) with varying concentration of BIL (0%-20%) and 20% wt PEGDA (FIG. 10B) with varying concentration of BIL (0%-20%).

Figure 11A:
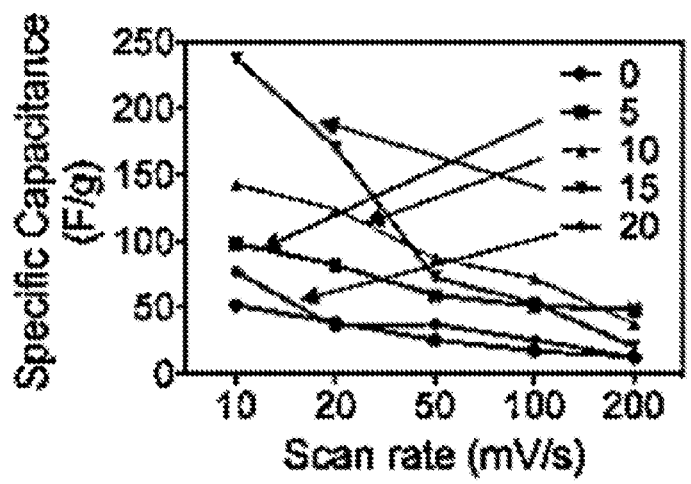
Figure 11B:
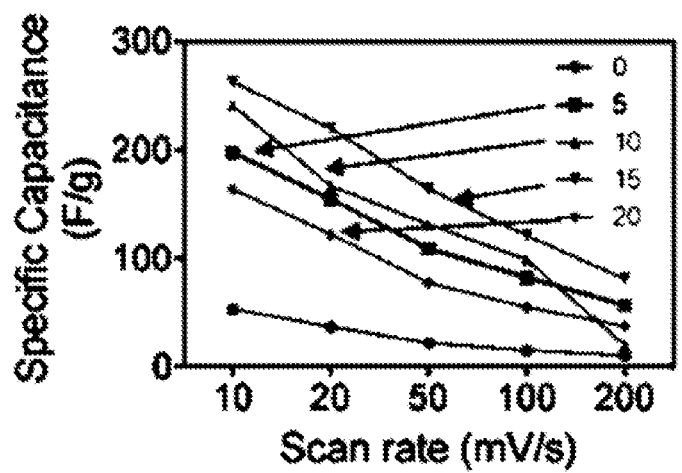
Figure 11C:
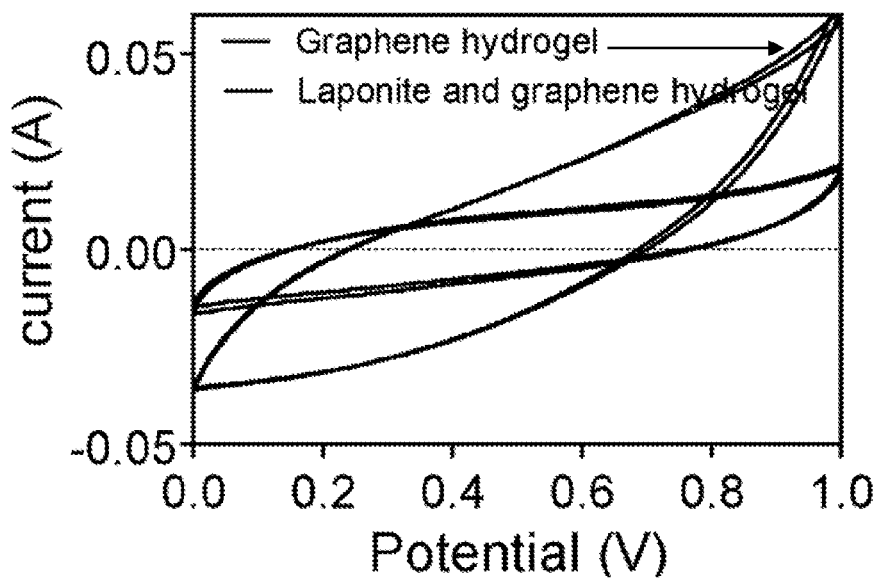

FIGS. 11A-11C show specific capacitance of the polymer electrolyte with graphene hydrogel as working electrode at different scan rate(10-200 mV/s). FIG. 11A is a graph for 20% (w/v) GelMA with varying concentration of BIL (0%-20%). FIG. 11B is a graph for 20 wt % PEGDA with varying concentration of BIL (0%-20%). FIG. 11C shows cyclic voltammetry of graphene hydrogel and laponite-graphene hydrogel composite at a scan rate of 100 mV/s.

Figure 12A:
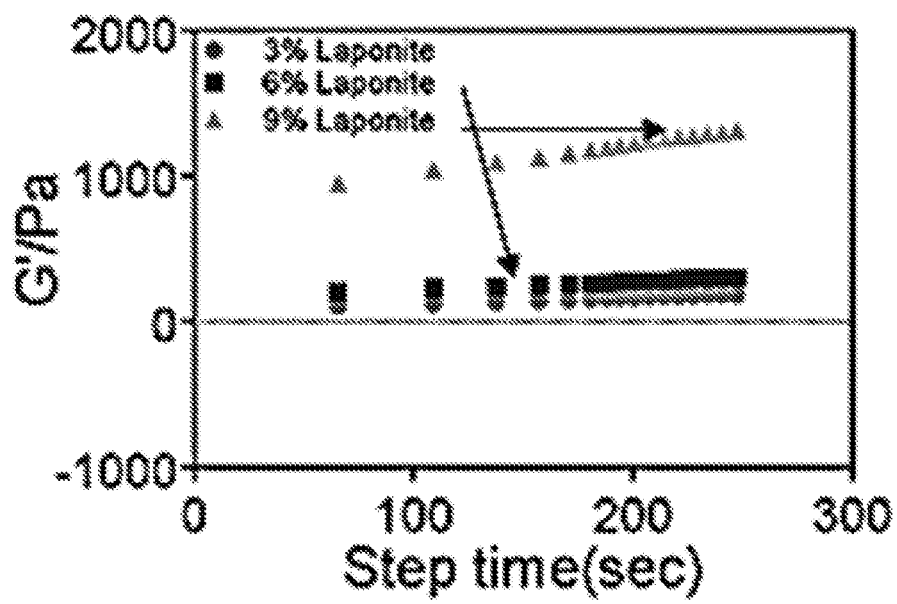
Figure 12B:
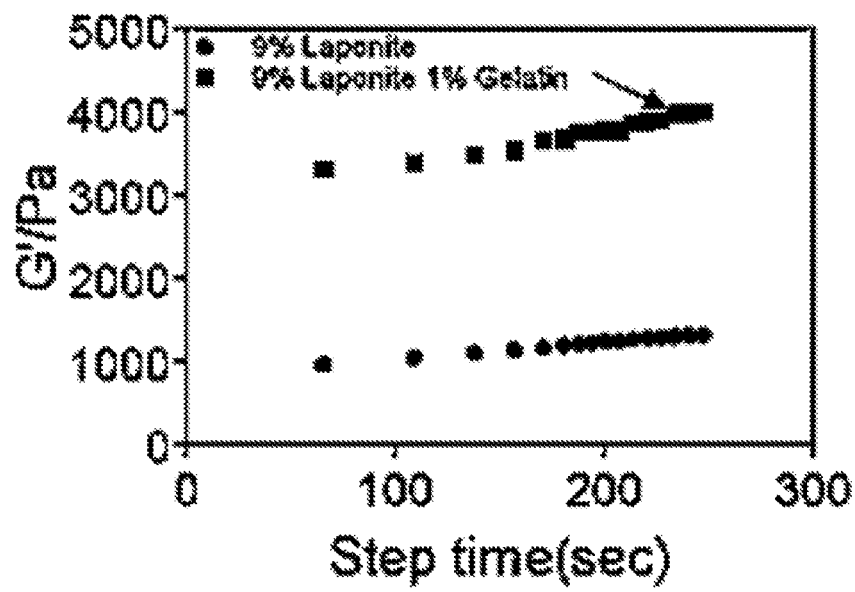
Figure 12C:
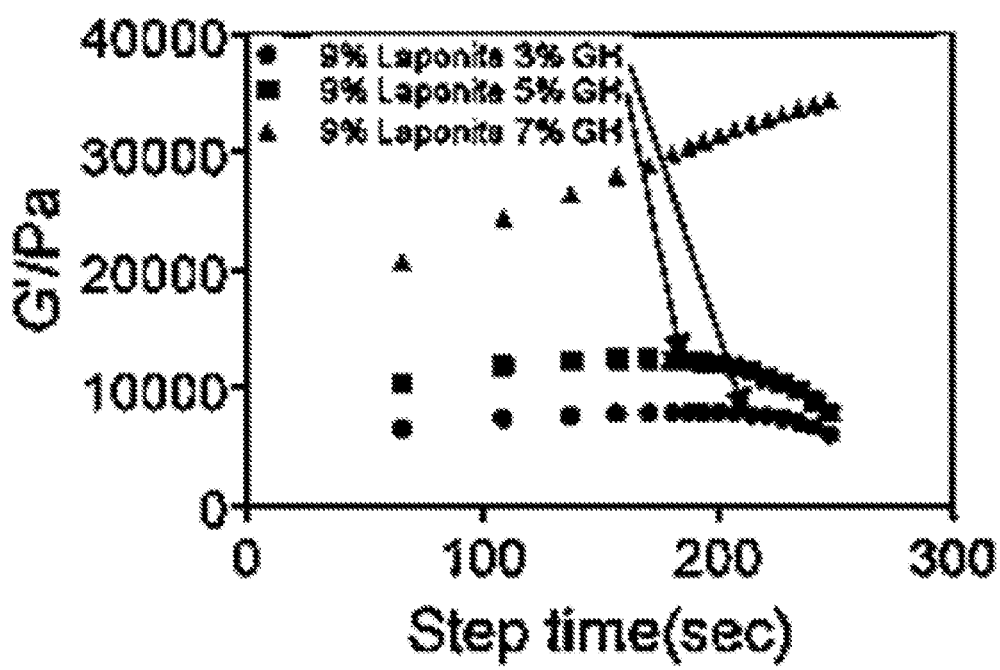
Figure 12D:
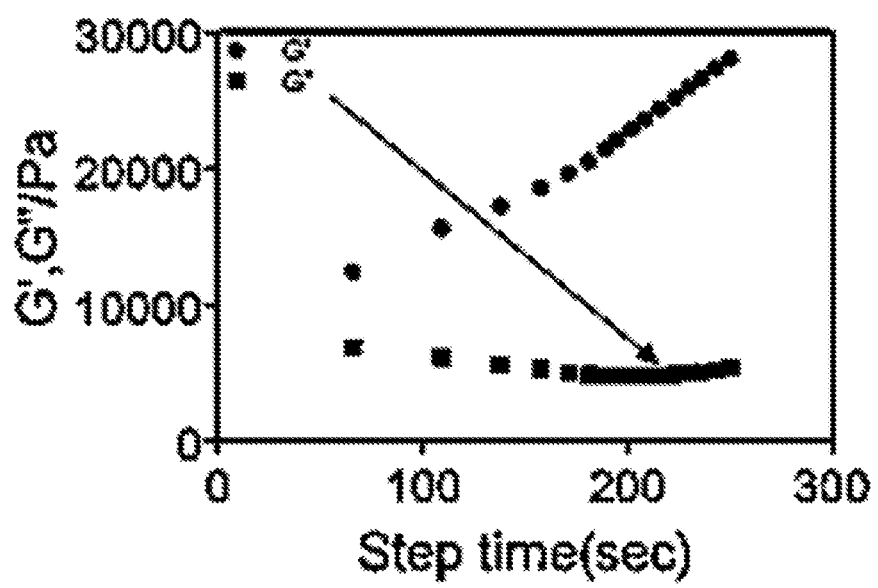

FIGS. 12A-12D are graphs showing rheological properties of varying percentage of laponite (FIG. 12A), comparing 9% laponite and mixture of 9% laponite and 1% gelatin (FIG. 12B); varying percentage of graphene hydrogel with 9% Laponite (FIG. 12C); final concentration of laponite and graphene hydrogel composite chosen for printing (9% Laponite 7% Graphene hydrogel 1% Gelatin) (FIG. 12D).

Figure 13A:
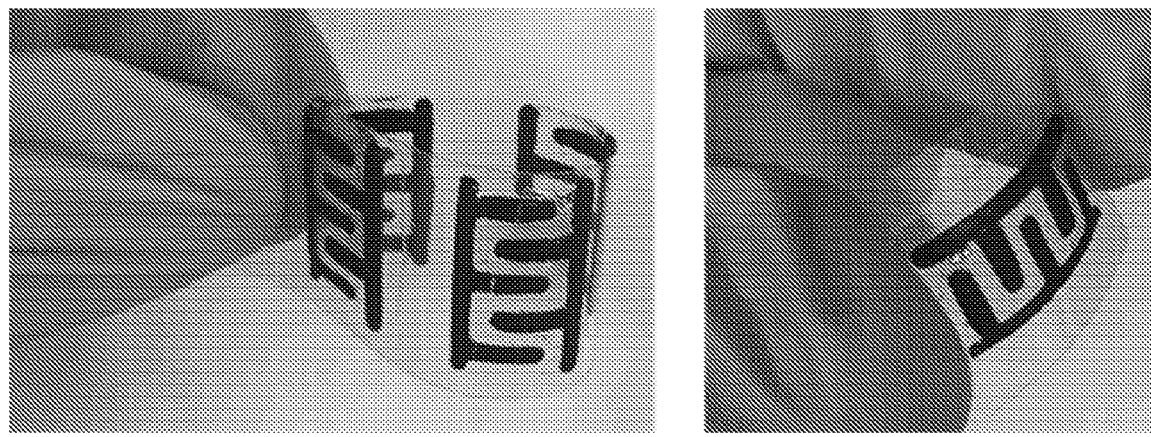
Figure 13B:
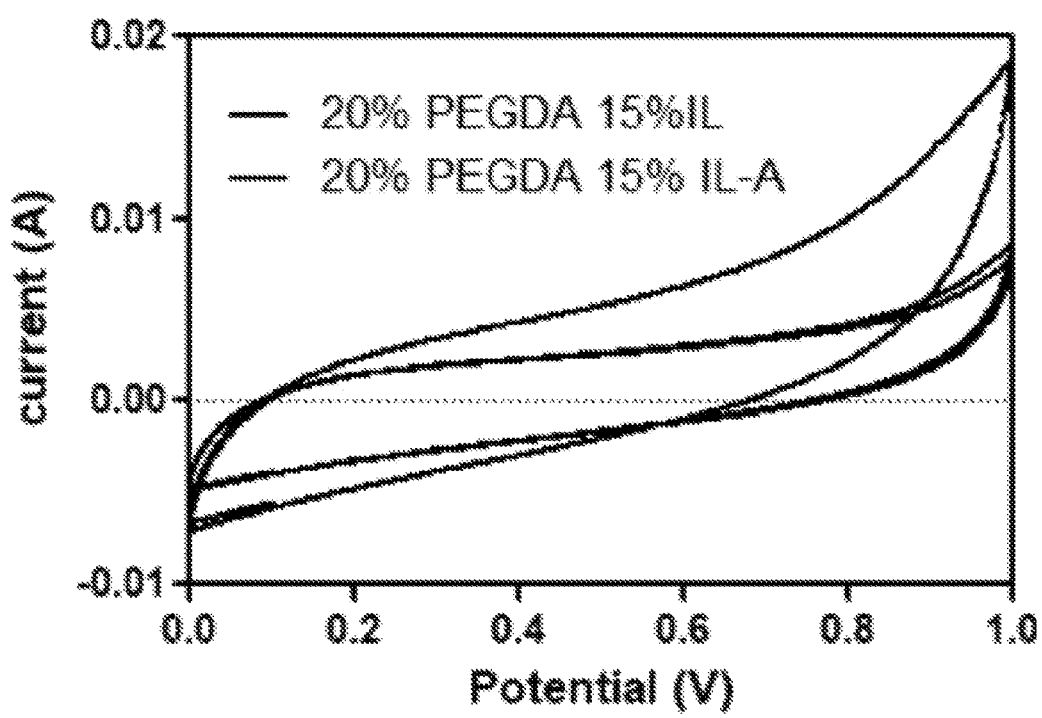
Figure 13C:
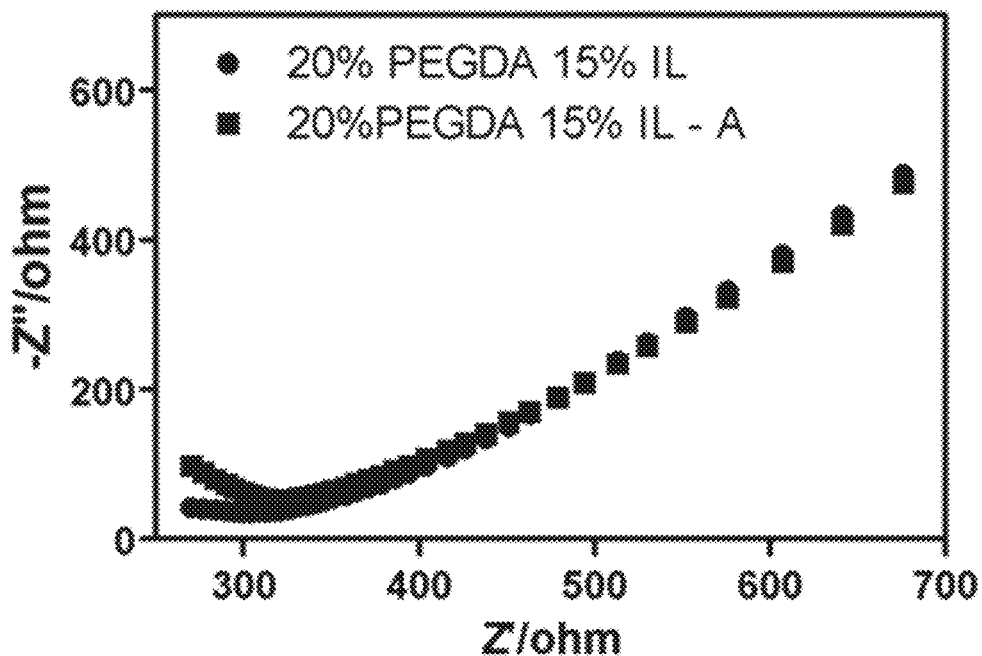
Figure 13D:
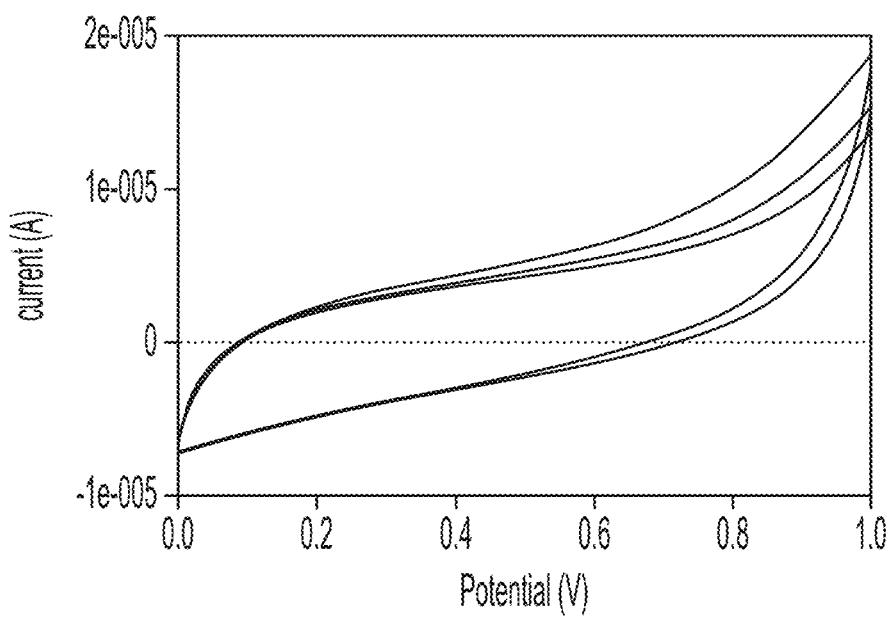

FIGS. 13A-13D show printing of BP electrolyte with 3% alginate and GH-L electrode (7% graphene hydrogel with 9% laponite) composite through a 0.51 mm nozzle using Allevi bioprinter. FIG. 13A is an image showing the printed BP-MSC's on a flexible sheet. FIG. 13B show cyclic voltammetry curve with a voltage window of 0.1V of BP and BP-alginate. FIG. 13C is a Nyquist plot of BP and BP-alginate. FIG. 13D shows cyclic voltammetry curve with a voltage window of 0.1V of the printed BP-MSC.

DETAILED DESCRIPTION OF THE INVENTION

Biocompatible polyelectrolytes with stimuli-responsive properties, e.g. responsive to ionic strength, pH, and electrical current, create a promising class of biomaterials for biomedical device fabrication. Electrically responsive biomaterials have several benefits, such as versatility and tunable response that can be achieved by tuning the applied current or the voltage. Gel electrolytes have attracted increasing attention for solid-state supercapacitors. An ideal gel electrolyte possesses a combination of high ion migration rate, reasonable mechanical strength and robust water retention at the solid state for ensuring excellent work durability.

Gelatin methacrylate (GelMA) and other biocompatible polymers such as poly(ethylene glycol) diacrylate (PEGDA) can be employed in various biomedical applications. When these polymers are combined with an ionic liquid, there is an increase in ionic conductivity of the polymer-containing composition. This increase in conductivity has been exploited for the use of polymers as electrolytes in the present invention.

The present invention relates in one aspect to a miniature high-performance polymer electrolyte-based energy storage device. In certain embodiments, the energy storage device comprises a polymer such as gelatin methacrylate (GelMa) or poly(ethylene glycol) diacrylate (PEGDA) functionalized with a bio-ionic liquid, such as but not limited to choline acrylate. Following are a non-limiting illustrations of a composition of the invention.

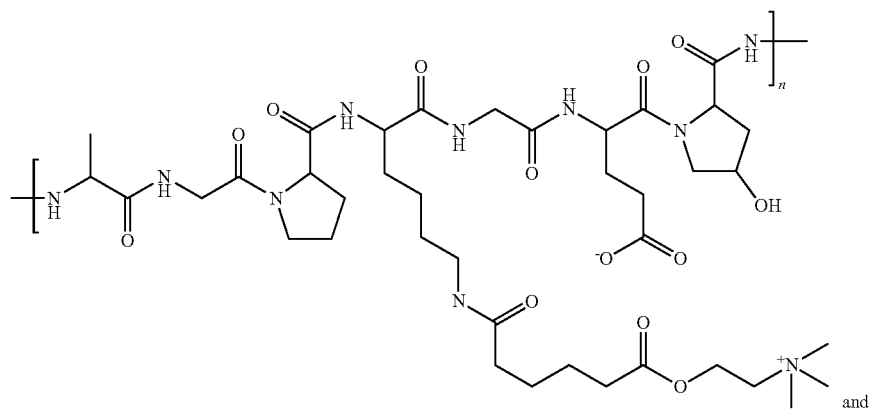

Bio Ionic-GelMA (BG)

and

-continued

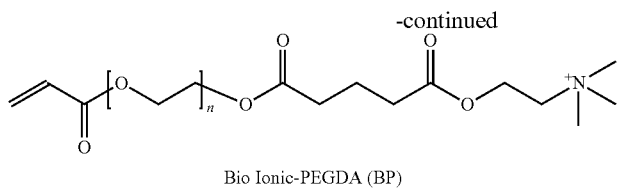

Bio Ionic-PEGDA (BP)

Definitions

As used herein, each of the following terms has the meaning associated with it in this section.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

Generally, the nomenclature used herein and the laboratory procedures in tissue engineering, chemistry, and biomaterial science are those well-known and commonly employed in the art.

As used herein, the articles "a" and "an" refer to one or to more than one (i.e., to at least one) of the grammatical object of the article. By way of example, "an element" means one element or more than one element.

As used herein, the term "about" is understood by persons of ordinary skill in the art and varies to some extent on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the terms "BG-0", "BG-5", "BG-10", "BG-15", and "BG-20" refer to 20% (w/v) GelMA comprising 0, 5, 10, 15, and 20% (w/v) bio-ionic liquid, respectively. Similarly, the terms "BP-0", "BP-5", "BP-10", "BP-15", and "BP-20" refer to 20% (w/v) PEGDA comprising 0, 5 10, 15, and 20% (w/v) bio-ionic liquid, respectively A "bio-ionic liquid" as used herein refers to a salt that has a melting temperature below room temperature (e.g., the melting temperature is less than 10° C., less than 15° C., less than 20° C., less than 25° C., less than 30° C., or less than 35° C.) and that contains a cation and an anion, at least one of which is a biomolecule (i.e., a molecule found in a living organism) or a biocompatible organic molecule. Non-limiting examples of bio-ionic liquids are organic salts of choline, such as carboxylate salts of choline, choline bicarbonate, choline maleate, choline succinate, and choline propionate. An ionic constituent of a bio-ionic liquid is a cation or anion component of a bio-ionic liquid. Non-limiting examples of ionic constituents of bio-ionic liquids for use in the invention are biocompatible organic cations such as choline and other biocompatible quaternary organic amines, as well as biocompatible organic anions such as carboxylic acids, including formate, acetate, propionate, butyrate, malate, succinate, citrate, and the like.

A "biocompatible polymer" as used herein refers to an organic polymer found in a living organism and/or compatible with a living organism (i.e., is not significantly rejected by the living organism). The polymer can be naturally occurring or synthetic, and charged or uncharged. In certain embodiments, the polymer is sufficiently hydrophilic to be capable of forming a hydrogel or serving as a component of a hydrogel. Non-limiting examples of biocompatible polymers for use in the invention include gelatin, elastin, elastin like polypeptides (ELP), chitosan, tropoelastin, collagen, hyaluronic acid (HA), alginate, poly(glycerol sebacate) (PGS), poly(ethylene glycol) (PEG), and poly(lactic acid) (PLA). A biocompatible polymer, conjugate, or other molecule or composition is capable of being in contact with cells without compromising their viability, such as by causing cell death, inhibition of cell proliferation, or exhibiting toxic effects on cellular metabolism or physiology of the organism. For example, a hydrogel is biocompatible if cells applied on its surface or embedded within its matrix remain viable as measured over a period of days, e.g., 5 days, 10 days, or 30 days.

As used herein, two elements (such as, but not limited to, an electrode and an electrolyte) are in "electrochemical contact" wherein they are at least in partial physical contact and an exchange of electrons and/or ions is possible between the two elements.

As used herein, the terms "functionalized", "covalently bound" or "covalently conjugated" refers to the formation of a covalent bond between two chemical species or moieties. Covalent bonds are to be taken to have the meaning commonly accepted in the art, referring to a chemical bond that involves the sharing of electron pairs between atoms.

As used herein, the term "gel" refers to a three-dimensional polymeric structure that itself is insoluble in a particular liquid but that is capable of absorbing and retaining large quantities of the liquid to form a stable, often soft and pliable, but always to one degree or another shape-retentive, structure. When the liquid is water, the gel is referred to as a hydrogel. Unless expressly stated otherwise, the term "gel" is used throughout this application to refer both to polymeric structures that have absorbed a liquid other than water and to polymeric structures that have absorbed water, it being readily apparent to those skilled in the art from the context whether the polymeric structure is simply a "gel" or a "hydrogel."

As used herein, "interdigitate" electrodes refers to electrodes that have at least a section of two interlocking comb-shaped electrode arrays, similar to a zipper.

The terms "patient," "subject" or "individual" are used interchangeably herein, and refer to any animal, or cells thereof whether in vitro or in situ, amenable to the methods described herein. In a non-limiting embodiment, the patient, subject or individual is a human. In other embodiments, the subject is a non-human mammal including, for example, livestock and pets, such as ovine, bovine, porcine, canine, feline, primate and murine mammals.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following abbreviations are used herein: BG-MSC=gelatin methacrylate micro-supercapacitor; BP-MSC=bio-ionic poly(ethylene glycol) diacrylate micro-supercapacitor; BIL=bio-ionic liquid (in certain non-limiting embodiments, choline acrylate), CFU=colony forming units, DPBS=Dulbecco's phosphate buffered saline, DSC=Differential Scanning calorimetry, EIS=electrochemical impedance spectroscopy, FTIR=Fourier transform infrared spectroscopy, GelMA=gelatin methacrylate, GelMA/BIL or BioGel or BG=choline acrylate functionalized gelatin methacrylate, GPC=Gel Permeation Chromatography, HEMP=hydroxymethyl-propiophenone, LAP=lithium phenyl-2,4,6-trimethylbenzoylphosphinate, MA=methacrylic acid, PEGDA=poly(ethylene glycol) diacrylate, PEGDA/BIL or BioPEG or BP=choline acrylate functionalized poly (ethylene glycol) diacrylate, PDMS=polydimethylsiloxane, TEOA=triethanolamine, Tg or $T_g$=glass transition temperature.

Compositions

In one aspect, the invention provides a gel electrolyte for energy storage device, wherein the electrolyte comprises a polymer functionalized with a bio-ionic liquid (BIL). In certain embodiments, the polymer is a gelatin methacrylate (GelMa) polymer. In other embodiments, the polymer is poly(ethylene glycol) diacrylate (PEGDA) polymer. In yet other embodiments, the BIL comprises choline. In yet other embodiments, in the BIL the choline is conjugated with an acrylate or methacrylate group, which forms a covalent group to a methacrylate group on GelMa or an acrylate group in PEGDA. In yet other embodiments, the BIL comprises choline acrylate or choline methacrylate.

In certain embodiments, the ratio of BIL and polymer in the functionalized polymer is about 1:4 (w/w) to about 4:1 (w/w). In other embodiments, the ratio of BIL and polymer in the functionalized polymer is about 1:1 (w/w). In yet other embodiments, the electrolyte comprises about 10% to about 30% (w/v) polymer. In yet other embodiments, the electrolyte comprises about 5% to about 20% (w/v) BIL. In yet other embodiments, the electrolyte comprises about 10% to about 20% (w/v) choline acrylate. In yet other embodiments, the electrolyte comprises about 10% to about 30% (w/v) polymer.

In certain embodiments, the electrolyte has porosity ranging from about 10 µm to about 80 µm. In other embodiments, the electrolyte has a compression modulus of at least about 30 KPa. In yet other embodiments, the electrolyte has an elastic modulus of at least about 200 KPa. In yet other embodiments, the device has a specific capacitance of at least about 150 F/g at a scan rate of about 10 mV/s.

In certain embodiments, the device is biocompatible and/or biodegradable. In other embodiments, the device is biocompatible with a mammal's tissue. In yet other embodiments, the device is implantable in a mammal in need thereof. In yet other embodiments, the device is intravascularly implantable in a mammal in need thereof.

In certain embodiments, the graphene gel is part of a composite further comprising a clay. In other embodiments, the clay comprises laponite.

In certain embodiments, the at least one electrode is at least partially interdigitated with another electrode. In other embodiments, the gel electrolyte and the electrodes are independently printed using extrusion-based 3D printing. In yet other embodiments, the graphene gel is a hydrogel. In yet other embodiments, the gel electrolyte comprises a hydrogel.

Functionalizing polymers with BIL for making electrolyte ensures electrolyte's long life even under mechanical and electrical cycles of wear and tear. It further ensures durability of electrolyte and safety in the presence of body fluids. In certain embodiments, the gel-like polymer electrolyte eliminates disadvantages associated with liquid electrolytes such as, for example, leakage, non-portability, and impossibility of miniaturization.

In certain embodiments, introduction of choline-based BILs significantly increases the strong electrostatic interactions. In an exemplary embodiments, the conductivity increased from 0 S/cm for unfunctionalized polymer to 0.04 S/cm for the BioGel with 20% (w/v) BIL. There is a 3.5-fold increase in conductivity with an increase in BILs concentration from 5% to 20% (w/v). Without wishing to be limited by any theory, this may be explained through an increase in ionizable groups per unit mass of the gel with an increase in BILs loading, the anion of the BILs structure proffering mobility and hence the significant conductivity.

In certain embodiments, the electrolyte can be used in a battery set up.

Devices

In another aspect, the invention comprises an energy storage device, comprising the electrolyte composition of the invention and an electrode comprising a composite of graphene hydrogel and laponite.

In certain embodiments, the device is a 3D-printed energy storage device.

In certain embodiments, the energy storage device is flexible/pliable.

In an exemplary embodiment, the device comprising the electrolyte composition of the invention and an electrode comprising graphene in a three-electrode system exhibited a specific capacitance of about 200 F/g. The electrolyte composition and the electrodes were 3D printed to create an electrochemical capacitor that exhibited the specific capacitance of about 16.33 µF/g at a current density of about 1 A/g. In certain embodiments, the volumetric capacitance of the 3D printed energy storage device was about 44.07 µF/cm³.

In another exemplary embodiment, high ionic liquid concentration exhibited well-defined discharge voltage plateau of ~0.5-0.8V, with a conductivity of about 8.5×10−4-3.5×10⁻³ S/m; specific capacitance of about 52-310 F/g at a current density of about 1 A/g with graphene electrode. Further maximum compression modulus was about 85 KPa and a tensile modulus was about 115 KPa.

In certain embodiments, the design of the device is such that the electrode and electrolyte interdigitate to allow maximum contact between the electrode and electrolyte. In certain embodiments, the number of interdigits is variable.

In certain embodiments, the device is biocompatible. In certain embodiments, the device is biodegradable.

In certain embodiments, the device is implantable in a subject in need thereof. In further embodiments, the device is intravascularly implantable.

In certain embodiments, the subject is a mammal. In certain embodiments, the mammal is human.

Methods

In yet another aspect the invention provides a method of forming the energy storage device of the invention. In certain embodiments, the method comprises forming a gel electrolyte composition of the invention. In certain embodiments, the method comprises forming an electrode composition comprising a composite of graphene hydrogel and laponite. In certain embodiments, the method comprises printing the gel electrolyte composition and the electrode composition using extrusion-based 3D printing.

In certain embodiments, the gel electrolyte composition is as described elsewhere herein.

In certain embodiments, the method of forming the gel electrolyte composition comprises contacting the polymer functionalized with the BIL in the presence of at least one photoinitiator. In certain embodiments, the at least one photoinitiator is selected from the group consisting of eosin Y, 2-hydroxy-2-methylpropiophenone, 2-methyl-4'-(methylthio)-2-morpholinopropiophenone, lithium phenyl-2,4,6-trimethylbenzoylphosphinate (LAP), 2-hydroxy-4'-(2-hydroxyethoxy)-2-methylpropiophenone (Irgacure), and hydroxymethyl-propiophenone (HEMP).

In certain embodiments, the electrolyte comprises about 1:4 to about 4:1 (w/w) BIL to polymer.

In certain embodiments, the electrolyte comprises about 1:1 (w/w) BIL to polymer.

In certain embodiments, the photoinitiator comprises about 0.5% (w/v) of the gel electrolyte composition.

In certain embodiments, the electrolyte further comprises a biocompatible aqueous buffer.

In certain embodiments, the gel electrolyte and the electrode are printed to form an interdigitating structure to increase the interaction between the electrode and the electrolyte thereby enhancing the electroactivity of the device.

In certain embodiments, the number of interdigits is variable.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. Although the description herein contains many embodiments, these should not be construed as limiting the scope of the invention but as merely providing illustrations of some of the presently preferred embodiments of the invention.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application. In general the terms and phrases used herein have their art-recognized meaning, which can be found by reference to standard texts, journal references and contexts known to those skilled in the art. Any preceding definitions are provided to clarify their specific use in the context of the invention.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials and Method

Polymer Electrolyte Synthesis

Polymer electrolyte were synthesized by mixing different ratios of methacrylated polymers and choline acrylate (BIL). To synthesize BIL, choline bitartrate and acrylic acid reacted in a 1:1 mole ratio at 50° C. for 5 hr. The product was washed with ethyl acetate, followed by rotary evaporation and freeze drying to make choline acrylate. GelMA and PEGDA were the two polymers used with BILs.

GelMA was synthesized using a method previously described in the literature (Noshadi, et al, 2017, Biomaterials Science 5 (10):2093-2105). Briefly, 10% (w/v) gelatin solution was reacted with 8 mL of methacrylic anhydride for 3 h. The solution was then dialyzed for 5 days to remove any unreacted methacrylic anhydride, and then placed in a −80° C. freezer for 24 h. The frozen acrylated polymer was then freeze-dried for 7 days. The PEGDA used for this research was purchased from Sigma Aldrich (average $M_n$ 700). To form bio-ionic polymer electrolyte BG and BP, the prepolymer and BILs were added to distilled water at varying final polymer concentrations and polymer/BILs ratios, then mixed with 0.5% (w/v) hydroxy methylpropiophenone (HEMP) photo initiator. Hydrogels were then rapidly photocrosslinked in the presence of UV light at a wavelength of 375 nm for 120 s and 60 s for GelMA and PEGDA respectively.

NMR Analysis $^1$H NMR analyses were performed to characterize polymer/BIL composite hydrogels using a Varian Inova-500 NMR spectrometer. $^1$H-NMR spectra were obtained from choline bitartrate, choline acrylate (BIL), GelMA prepolymer, and Gel electrolytes. Methacrylated groups were identified due to the presence of peak values at δ=5.3 and 5.7 ppm. The decreasing rate for the C=C double bond signals (−∂(C=C)∂t) in methacrylate group of GelMA was associated with the extent of crosslinking of composite hydrogel as well as conjugation of BILs to GelMA. This area decrease was calculated using the following equation:

$$\text{Decay of Methyl group }\% = [(PA_b - PA_a)/PA_b]*100$$

where $PA_b$ and $PA_a$ represent the peak areas of methacrylated groups before and after photocrosslinking, respectively. Accordingly, $PA_b - PA_a$ corresponds to the concentration of methacrylated groups consumed in the photocrosslinking process. ACD/Spectrus NMR analysis software were used to integrate the area under the peaks and all the data was analyzed with respect to phenyl group peaks at δ=6.5-7.5 ppm.

Mechanical Testing

Mechanical testing on BG and BP were performed, both the elastic and compressive modulus were analyzed for each of the hydrogels with varying final polymer and BIL concentration. Composite hydrogels were created by using PDMS molds, which formed for tensile tests and cylindrical hydrogels (diameter: 5.5 mm, height: 4 mm) for compression tests. The hydrogels were allowed to swell in DPBS for 2 hr at 37° C. prior to mechanical testing. At least 5 samples were tested for each condition.

For the compression tests, hydrogels were placed between two compression plates, and compression was applied to each sample at a rate of 1 mm/min. Compression (mm) and load (N) were recorded during each test using. Compression modulus was calculated as the tangent slope of the initial linear region of the stress-strain curve between 0 mm/mm and 0.1 mm/mm compressive strain. For the tensile tests, hydrogels were held between two tensile grips and stretched at a rate of 1 mm/min until failure. The elastic modulus was calculated as the tangent slope of the stress-strain curve. At least 5 samples were tested per condition to obtain average and standard deviation.

In Vitro Degradation Test

BG and BP were fabricated as previously explained for compression test and were then freeze-dried, weighed and were placed in 24-well plate with 1 ml of DPBS or at 37° C. in an oven continuously for 2 weeks. The DPBS/FBS solutions were refreshed every 3 days to maintain constant enzyme activity. At prearranged time points (after 1, 7 and 14 days), the DPBS/FBS solutions were removed and the samples were freeze-dried for 24 h and weighed.

Swelling Ratio Measurements

The equilibrium swelling ratio of BG and BP composite hydrogels were evaluated. For this purpose, cylinder-shaped hydrogels were prepared. Prepared hydrogels were washed three times with DPBS, lyophilized, and weighed in dry conditions. Thereafter, the samples were immersed in DPBS at 37° C. for 4, 8 and 24 h and weighed again after immersion. The swelling ratio and water uptake capacity of the samples were calculated as the ratio of the swelled sample mass to the mass of lyophilized sample.

SEM Analysis

SEM analysis was performed to evaluate the porosity of the engineered gel electrolytes. The samples were prepared in a similar procedure as described for swelling ratio tests. The freeze-dried samples were then coated by gold (Au) before SEM analysis. The SEM images were acquired by using a Phenom. Pore size analysis of the Gels was performed by measuring the pore sizes of at least three images of four samples using ImageJ software.

Electrochemical Measurements

Electrochemical performances of the supercapacitor cells were tested by CV, galvanostatic charge/discharge and electrochemical impedance spectroscopy (EIS, on a CHI 660 potentiostat, CH Instruments, Inc.). All of the experiments were carried out in a three-electrode system. The potential range for CV measurements and galvanostatic charge/discharge tests was 0-1 V. EIS tests were carried out in the frequency range of $10^5$-0.05 Hz at all) mV amplitude referring to open circuit potential. The mass specific capacitances ($C_{sc}$) were calculated by using the equations $C_{sc}=2$ (I$\Delta$t/m$\Delta$V), where I is the constant discharge current, $\Delta$t is the discharging time, m is the mass of one electrode, and $\Delta$V is the voltage drop upon discharging (excluding the IR drop). The energy density (E) and power density (P) of GH electrode depicted in the Ragone plot were calculated by using the equations $E=(1/8)C_{sc}\Delta V^2$ and $P=E/\Delta t$, respectively.

Surface Seeding (2D Culture)

$2\times10^4$ cells/scaffold were seeded on the surface of the hydrogels and placed in 24-well plates with 500 µl of growth medium (DMEM supplemented with 10% fetal bovine serum). 2D cultures were maintained at 37° C. in a 5% $CO_2$ humidified atmosphere for 10 days and culture medium was replaced every 48 h.

Cell Viability

The viability of primary C2C12 grown on the surface of GelMA and GelMA/Bio-IL hydrogels was evaluated using a commercial live/dead viability kit (Invitrogen), according to instructions from the manufacturer. Briefly, cells were stained with 0.5 µl/ml of calcein AM and 2 µl/ml of ethidium homodimer-1 (EthD-1) in DPBS for 15 min at 37° C. Fluorescent image acquisition was carried out at days 1, 4, and 7 post-seeding using an AxioObserver Z1 inverted microscope (Zeiss). Viable cells appeared as green and apoptotic/dead cells appeared as red. The number of live and dead cells was quantified using the ImageJ software. Cell viability was determined as the number of live cells divided by the total number of live and dead cells using ImageJ.

Metabolic Activity

The metabolic activity of the cells was evaluated at days 1, 4, 7 post-seeding, using a PrestoBlue assay (Life Technologies) according to instructions from the manufacturer. Briefly, 2D and 3D cultures of primary CMs were incubated in 400 µL of growth medium with 10% PrestoBlue reagent for 2 h at 37° C. The resulting fluorescence was measured (excitation 530 nm; emission 590 nm) using a SpectraMax. Control wells without cells were used to determine the background for all experiments.

Cell Adhesion, Proliferation and Spreading

Spreading on the surface of the engineered composite hydrogels was visualized through fluorescent staining of F-actin filaments and cell nuclei. Briefly, prepare 0.1% PBT, fresh fix solution (4% PFA in 0.1% PBT), and staining solution (DAPI and phalloidin in PBS at a 1:1000 dilution). Remove media from cells and dispense 150 µl/well of 1× PBS, into each 12-well plate. Remove PBS by shake out method. Dispense 150 µl/well of fix solution and fix cells for 25 minutes, discard the fix solution by shake out method. Dispense 200 µl/well of PBT and incubate for 5 minutes, shake out and repeat two more times for a total of 3 washes. Remove PBT dispense 150 µl/well staining solution and incubate for 25-30 minutes. Discard the staining solution and dispense 150 µl/well of 1× PBS, allow to sit for 5 minutes, shake out and repeat two more times for a total of 3 washes. Remove PBS by shake out method and add 50 µl/well of 1× PBS to keep the cells hydrated while imaging. Fluorescent image acquisition was carried out using an Axio Observer Z1 inverted microscope.

In Vivo Degradation and Compatibility

Male Wistar rats (200-250 grams) obtained from Charles River (Boston, Mass., USA) and housed in the local animal care facility under conditions of circadian day-night rhythm. Anesthesia was achieved by 2.0 to 2.5% isoflurane inhalation, followed by 0.02 to 0.05 mg/kg SC buprenorphine administration. After inducing anesthesia, eight 1-cm incisions were made on the posterior medio-dorsal skin, and small lateral subcutaneous pockets were prepared by blunt dissection around the incisions. GelMA/Bio-IL hydrogels (1×5 mm disks) were implanted into the pockets, followed by anatomical wound closure and recovery from anesthesia. Animals were euthanized by anesthesia/exsanguination at days 4, 14 and 28 post-implantation, after which the samples were retrieved with the associated tissue.

Histological Analysis and Immunofluorescent Staining

Histological analyses were performed on cryosections of the explanted hydrogel samples in order to characterize the inflammatory response elicited by the implanted material.

After explantation, samples were fixed in 4% paraformaldehyde for 4 hours, followed by overnight incubation in 30% sucrose at 4° C. Samples were then embedded in Optimal Cutting Temperature compound (OCT) and flash frozen in liquid nitrogen. Frozen samples were then sectioned using a Thermofisher Cryostat. 15-μm cryosections were obtained and mounted in positively charged slides using DPX mountain medium (vwr). The slides were then processed for hematoxylin and eosin staining according to instructions from the manufacturer. Immunohistofluorescent staining was performed on mounted cryosections anti-CD68 were used as primary antibodies, and an Alexa Fluor 594-conjugated secondary antibody was used for detection. All sections were counterstained with DAPI (Invitrogen), and visualized on an AxioObserver Z1 inverted microscope (Zeiss).

Example 1

Synthesis and Characterization of Flexible Electrolyte

The BIL functionalized hydrogel electrolyte was synthesized through reaction of BIL (choline acrylate) and biocompatible polymer GelMA (Nichol, et al., 2010, Biomaterials 31:5536-5544), and synthetic polymer PEGDA (average $M_n$ 700). Choline derivatives with low melting points have been used as ionic liquid, and mixtures of choline and other salts yield viscous liquid that conducts at or around room temperature.

Choline bitartrate is a basic constituent of lecithin that is found in many plants and animal organs. It is important as a precursor of acetylcholine, as a methyl donor in various metabolic processes, and in lipid metabolism making it biocompatible. Polymer/BIL were synthesized by mixing 20% (w/v) GelMA, 20% (v/v) PEGDA and (0, 5 10, 15, 20%) (w/v) BIL at room temperature to form corresponding Bio-Ionic GelMA (BG-0, BG-5, BG-10, BG-15, BG-20) and bio-ionic PEGDA (BP-0, BP-5, BP-10, BP-15, BP-20) as shown in FIGS. 1A-1D. The resulting polymer/BIL was then crosslinked into a gel electrolyte via UV light photopolymerization, using HEMP (hydroxymethyl-propiophenone) as photo-initiator. Structural analysis based on FTIR and NMR (FIGS. 7A-7B) revealed the acrylation of the choline bitartrate to synthesis choline acrylate and conjugation of BIL with the polymer. The acrylate peak at 1720 $cm^{-1}$ in the IR spectrum confirms the acrylation of the choline bitartrate. Further, the hydrogen atom in acrylate group has been indicated at 5.8-6.3 ppm in $^1H$ NMR (FIG. 7B) substantiates the synthesis of choline acrylate. In addition, GelMA/BIL was also subjected to $^1H$ NMR analysis, indicating the methacrylate group disappearing after the crosslinking.

The extent of BILs functionalization and crosslinking density of the hydrogel are both expected to bring about changes to fundamental physical properties of the gel electrolyte. This swelling and diffusive properties affect the shape and size of ion migration channels, which in turn are expected to influence electrochemical properties. Also, the electroactivity of the polymer-based hydrogels is greatly associated with the ionic and electronic transport processes at the interface between the electrode and electrolyte solution. Therefore, the electrochemical processing efficiency would be improved if they possessed high porosity and large interfacial areas. Scanning electron microscopy (SEM) showed that the polymer/BILs composite is porous and porosity varies with varying concentration of the ionic liquid, thus indicating that it can be modified to make it more suitable for ion transfer. The porosity of BG-0 and BP-0 is 61.18±2.18 μm and 29.57±2.03 μm, respectively (FIG. 7C), whereas the porosity decreases with increasing concentration of BILs, with 15% (w/v) BIL concentration there is a decrease to 39.65±1.09 μm and 20.53±1.25 μm. With the increase in the BIL concentration the ions increase thus providing short diffusion path.

The swelling of gel electrolyte was evaluated. FIGS. 8C-8D represent the swelling ratio—measured by water uptake of the compositions in PBS and FIGS. 8A-8B represent the degradation ratio—measured by the weight decrease of freeze-dried samples kept in PBS. The measurements were taken over a time period with varying BILs loading in the GelMA structure. All compositions show a similar pattern of a sharp water uptake in the swelling ratio experiment, finally reaching an equilibrium swelling level. The rate of water uptake is the sharpest and equilibrium swelling level the maximum with unfunctionalized GelMA. The in vitro swelling and degradation studies enables the understanding and predict in vivo degradation behavior, also to establish electroconductive properties water uptake and degradation plays an essential role.

Degradation studies show that, with the increase in BILs percentage, the degradation increases from 7.3%±0.7% at day 1 to 14%±1% at day 14 after incubation. 20% (w/v) GelMA and similarly the degradation increases from 24%±0.8% at day 1 to 32%±1.0% at day 14 with a 20% concentration of BIL, and swelling behavior of a hydrogel is a key feature in determining the water uptake, with increasing concentration of the BILs from 0 to 20% (w/v) the swelling ratio decreases. The maximum swelling ration at 0% BILs concentration, increasing from 73.9%±2.5% at 1 hr to 159%±5% at 24 hrs after incubation, whereas the swelling ration decreased to 34.4%±3.4% at 1 hr and 50.7%±8.7% at 24 hrs after incubation for 20% BILs concentration. The increasing amount of ions from the BILs decreases the swelling ration significantly, because due to the increase in the concentration of ionic liquid there is an increase in the crosslinking and thus decrease in the space for accommodation of water in the hydrogel network, further leading to decreasing swelling ratio.

The mechanical strength of hydrogel has a vital role in solid-state supercapacitors. An increase in the BILs content from 0-5% (w/v) sees a nearly 50% jump in the compressive modulus (FIGS. 8E-8H). The compressive modulus with BG-20 content is 8 times higher than unfunctionalized polymer BG-0. Notably, the polymer electrolyte has increased mechanical properties with increase in BILs concentration, BG-0 exhibits a compression modulus of 12.8±1.5 KPa and a tensile modulus of 139±28 KPa, whereas for BG-20 compression and tensile modulus increases to 190±4 KPa and 455±5 KPa, respectively. Similarly, BP-0 exhibits compression and tensile modulus are 8.64±1.18 KPa and 96.5±6.5 KPa whereas, with the increase of BIL concentration to 20% (w/v) the compression and tensile modulus increases to 74.5±3.0 KPa and 284.7±5.7 KPa, respectively. Thus, the mechanical properties can be modulated based on the percentage concentration of BIL to be able to fabricate the device in different shapes.

These enhancements can be attributed to increase in the amount and concentration of electrostatic interactions. The increase in compressive strength over unfunctionalized GelMA can be further attributed to the attachment of the bulky choline-based functionalization as side chains to the GelMA (or PEGDA) structure. The mechanical properties are also related to an increase in the overall molecular weight—which gets a significant contribution from the bulky choline side chains. The unfunctionalized GelMA (or PEGDA), on its own, has some amount of polar and hydrogen bond-based interactions. Without wishing to be limited by any theory, the introduction of the BILs significantly increases these strong electrostatic interactions which disallow the uncoiling and slipping of chains, tethering the structure together through these strong interactions hence leading to enhanced moduli.

Example 2

Electrochemical Characterization

To evaluate the capacitance and power stability, cyclic voltammetry experiments were performed at scan rates ranging from 10 to 200 mVs$^{-1}$. Compared with GCE as working electrode graphene hydrogel exhibited an exceptionally enhanced electrochemical performance with a nearly rectangular CV shape, indicative of the typical double-layer capacitive behavior. An increase of ionic liquid concentration exhibits a well-defined discharge voltage plateau of ~0.5-0.8V with a conductivity of $8.5 \times 10^{-4}$-$3.5 \times 10^{-3}$ S/m in both the polymers. The ionic conductivity increases from $8 \times 10^{-4} \pm 7 \times 10^{-5}$ S/m to $15.3 \times 10^{-3} \pm 3.3 \times 10^{-4}$ S/m (FIGS. 9A-9C) with increase of the BIL concentration from 0-20% (w/v). Gel electrolyte was also tested as electrochemical capacitor based on graphene synthesized as electroactive material, exhibits a specific capacitance of 325 F/g at a current density of 1 A/g in a three-electrode system. A linear dependence of the discharge current on the scan rate was recognized at least up to 200 mVs$^{-1}$ (FIGS. 2A-2F). Remarkably, the cycling performance of the electrolyte was examined up to 10,000 cycles at a scan rate of 50 mVs$^{-1}$ charged and discharged rapidly up to while maintaining excellent capacitance, characteristic of a high instantaneous power.

In general, with increasing scan rate, local electrolyte diffusion towards the electrode becomes difficult with rate limited by diffusion. This in effect decreases the interaction between the electrolyte and electrode, hence causing the specific capacitance to decrease. At lower scan rates, electrolyte ions have sufficient time to diffuse towards and interact with the electrode material, while higher scan rates encourage only surface accumulation. It is this very trend that is reflected for the compositions from 0% BIL to 10% BIL (FIG. 11A-11C), the only difference being the concentration of diffusible ionic species brought about by the IL functionalization via the polarization of the hydration spheres. However, an anomaly is seen with further increase in the BIL loading to 15 and 20%. At 15% BIL loading the specific capacitance jumps up in accordance to the trend, reducing to a lower level with a further increase in loading 20%. The reaction pathway for increased BIL loading also proffers an increased propensity for network formation as is seen in the swelling and degradation ratio experiments. With an increase in network formation, the natural diffusivity of any ionic species decreases, leading to the observed phenomenon of a decrease in specific capacitance even with increased ionic functionalization, all the while maintaining the same trend of specific capacitance versus scan rate. Further, Table 1 also shows specific capacitance with varying concentration of ionic liquid and scan rate.

TABLE 1

| Ionic Liquid Concentration (%) | Specific Capacitance 20% GelMA F/g | Specific Capacitance 20% PEGDA F/g |
|---|---|---|
| 0 | 52.26 | 190 |
| 5 | 98.54 | 205 |
| 10 | 142.5 | 250 |
| 15 | 238 | 310 |

Graphene based 3D porous structure has received increasing attention for fabricating electrochemical supercapacitors. Typical 3D graphene macrostructures such as graphene hydrogels or aerogels could be easily prepared by one-step chemical reduction of a graphene oxide dispersion (Park, et al., 2011, Carbon 49:3019-3023) in which flexible graphene sheets partially overlap in 3D space to form interconnected porous microstructure. Previously established devices have been using liquid electrolytes or substrates to encapsulate the electrolyte, whereas present invention employs a flexible polymer gel electrolyte with volumetric capacitance of 294.17±2.964 F/cm$^3$ and 113.455±1.495 F/cm$^3$ for BG-15 and BP-15 respectively at 200 mv/s. With an exceptionally high surface area (up to 1000 m$^2$/g based on methylene blue molecular adsorption), these mechanically strong and electrically conductive 3D graphene materials have been directly used as binder-free supercapacitor electrodes with excellent specific capacitances (160-240 F/g), rate capability, and cycling stability Example 3

Printing of Energy Storage Device

Figure 1A:
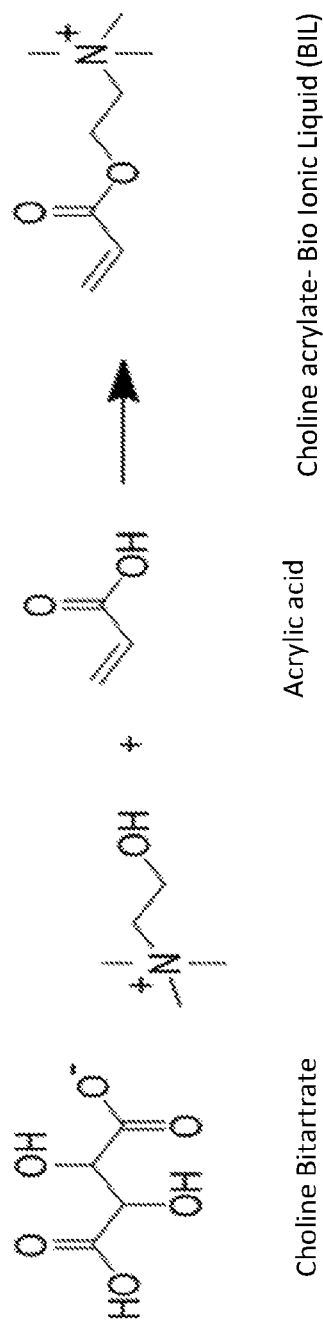
FIGS. 1A-1F show synthesis and fabrication of gelatin methacrylate micro-supercapacitor (BG-MSC) and bio-ionic poly(ethylene glycol) diacrylate micro-supercapacitor (BP-MSC). Synthesis of Bio-ionic liquid (BIL) is shown in FIG. 1A. Synthesis of Bio-Ionic GelMA (BG) and Bio-Ionic PEGDA (BP) in the presence of lithium phenyl-2,4,6-trimethylbenzoylphosphinate (LAP) as a photo initiator and visible light 405 nm at an intensity of 10 mW/cm$^2$ for 60 secs is shown in FIG. 1B. Synthesis of the graphene hydrogel-laponite (GH-L) composite is shown in FIG. 1C. Graphene and biopolymer hydrogels are shown in FIG. 1D.
Figure 1B:
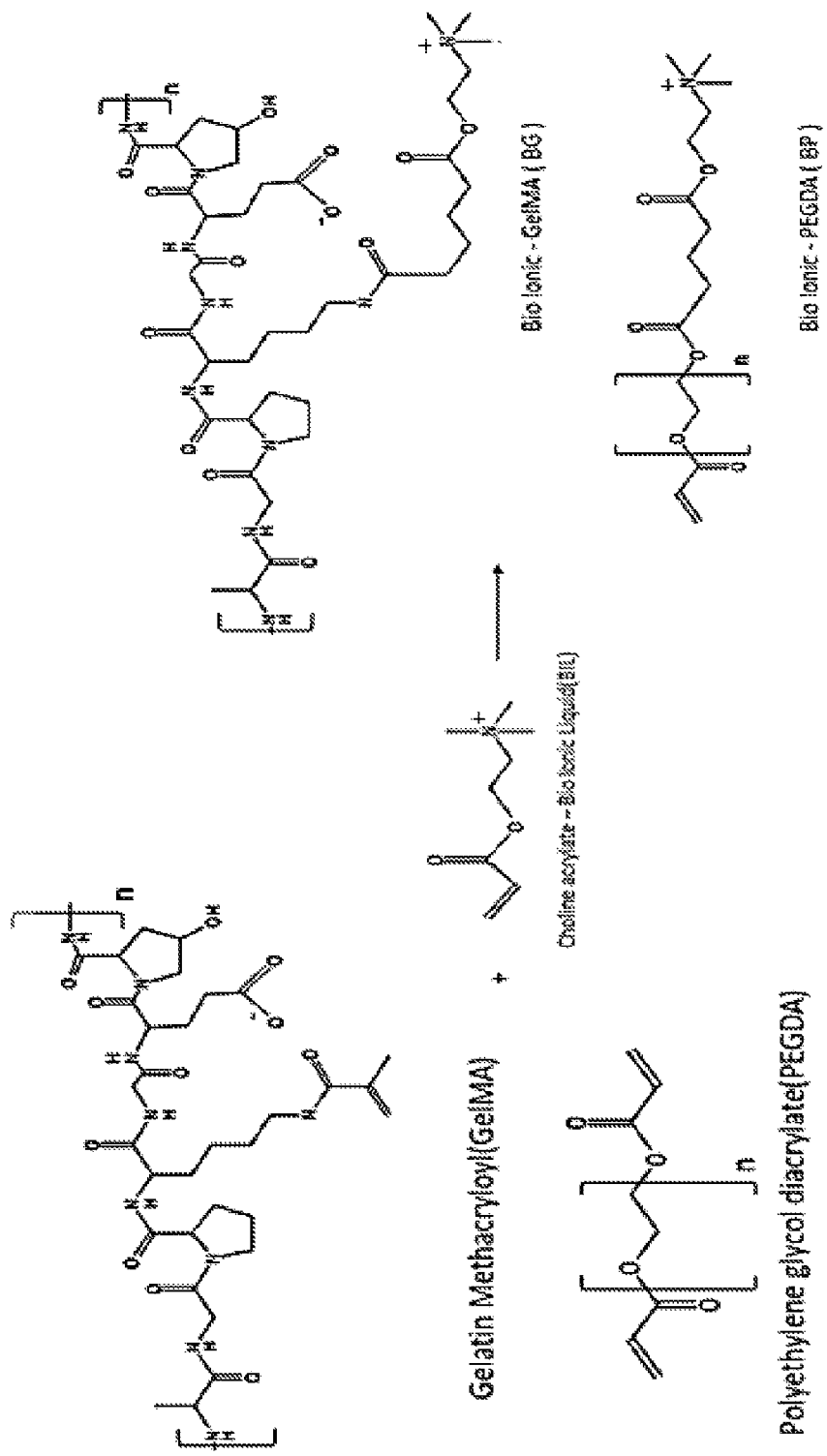
Figure 1C:
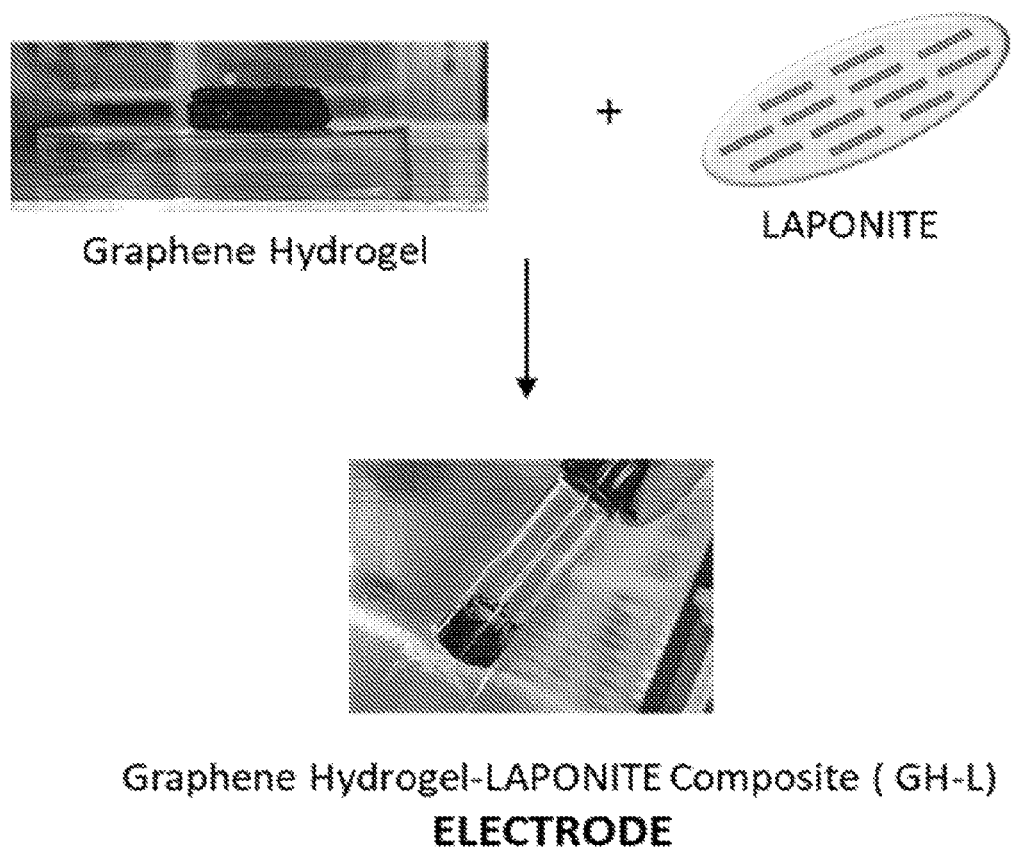
Figure 1D:
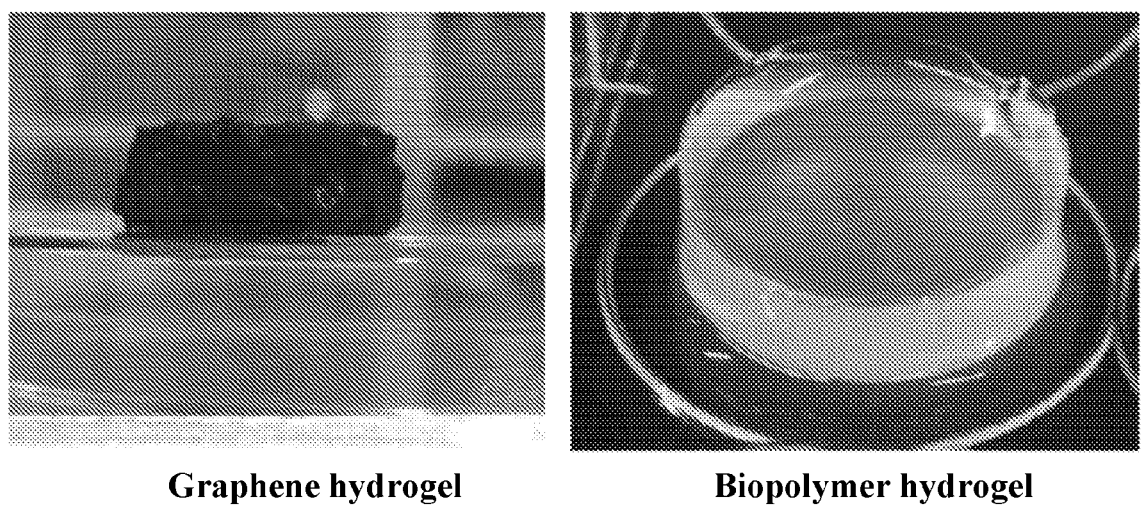
Figure 1E:
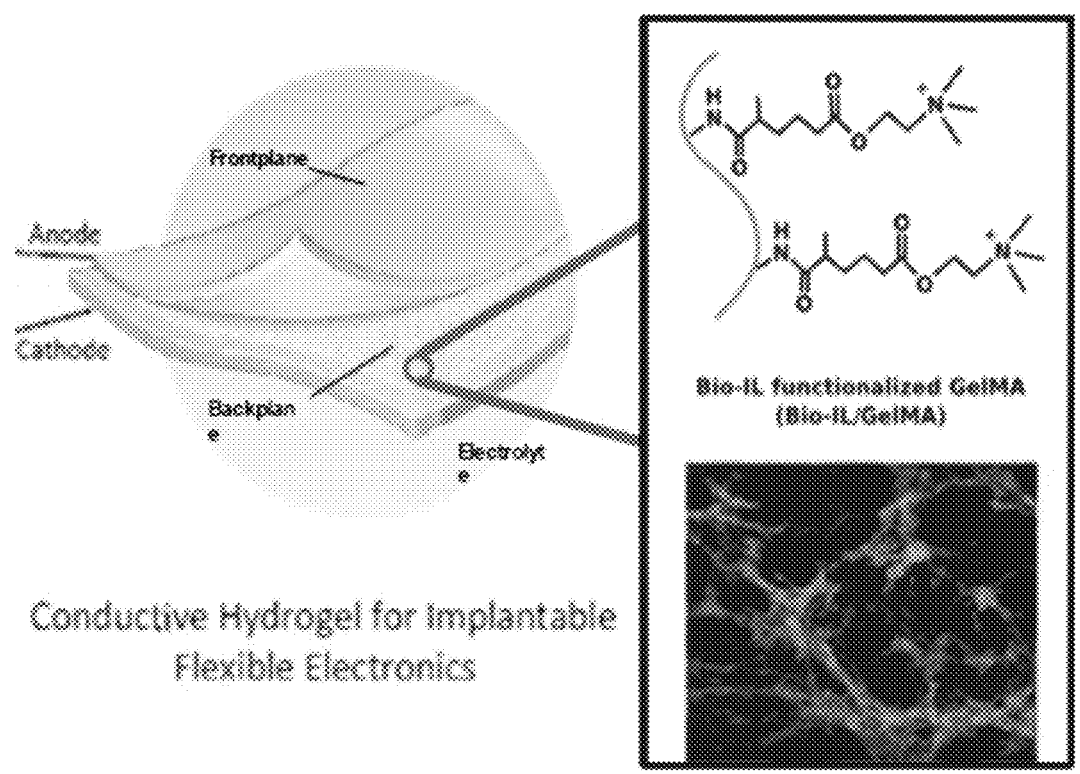
Figure 1F:
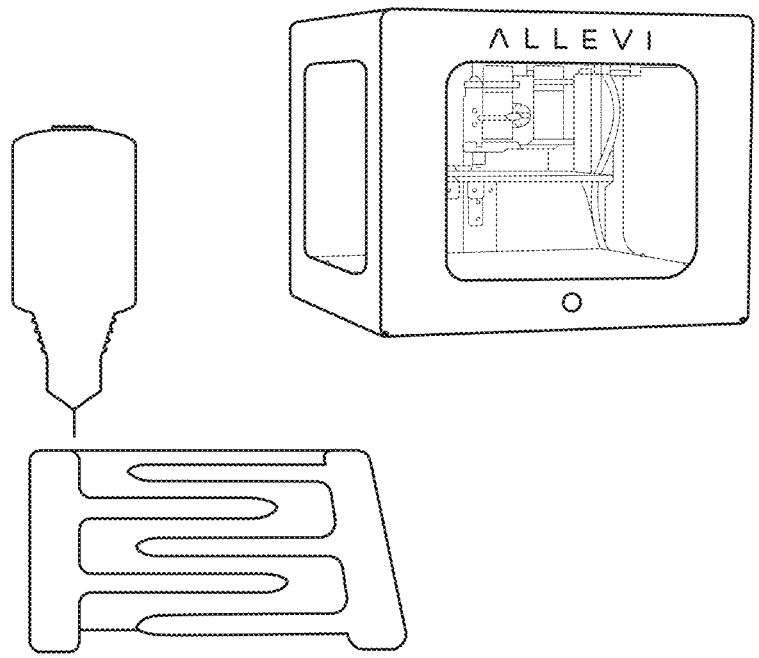
Figure 2A:
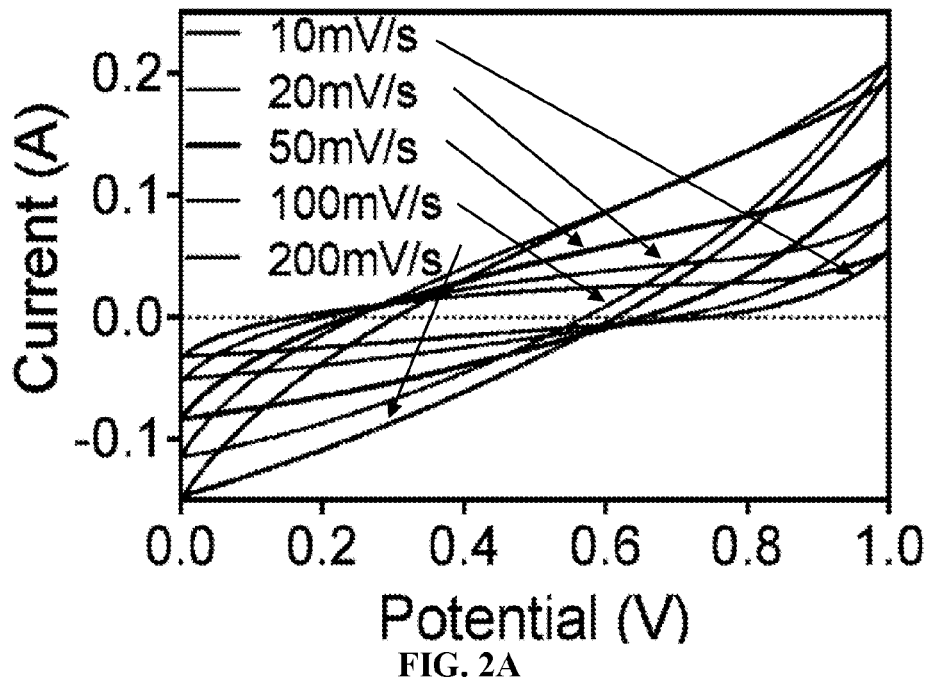
FIGS. 2A-2F are graphs illustrating electrochemical performance of gel electrolyte. CV profile at different scan rates (10-200 mV/s) with a voltage window 1V are shown in FIGS. 2A-2B, where BG-15 and BP-15 with GH-L forms a working electrode and Ag/AgCl is used as a reference electrode. Capacitance retention for BG-15 and BP-15 up to 10000 cycles is shown in FIG. 2C and FIG. 2D, respectively. Galvanostatic charge/discharge curve of GH-L as working electrode and PBS, BG-0, BG-15, BP-0 and BP-15 as electrolyte at 0.1 A cm$^{-3}$ is shown in FIG. 2E.
Figure 2B:
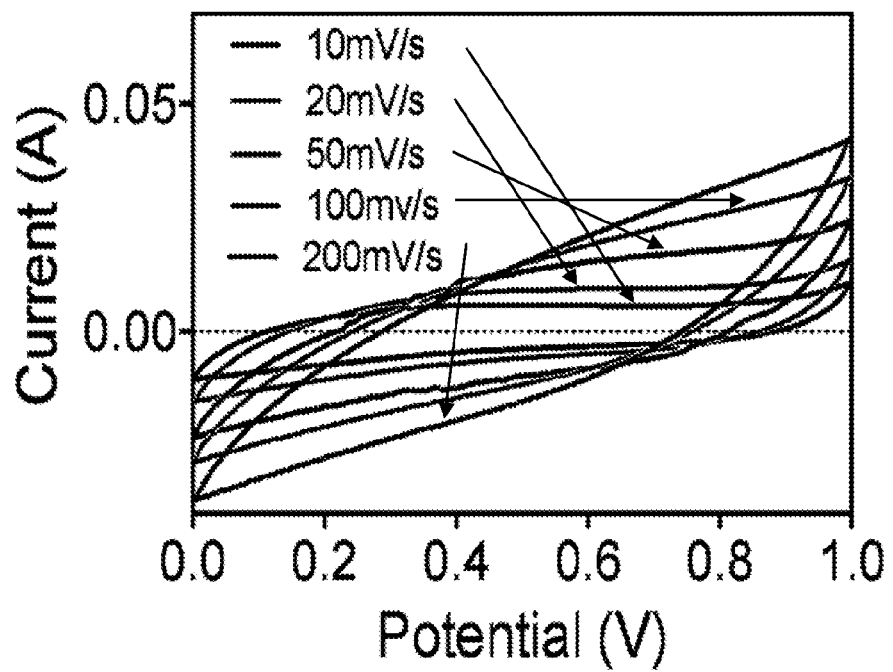
Figure 2C:
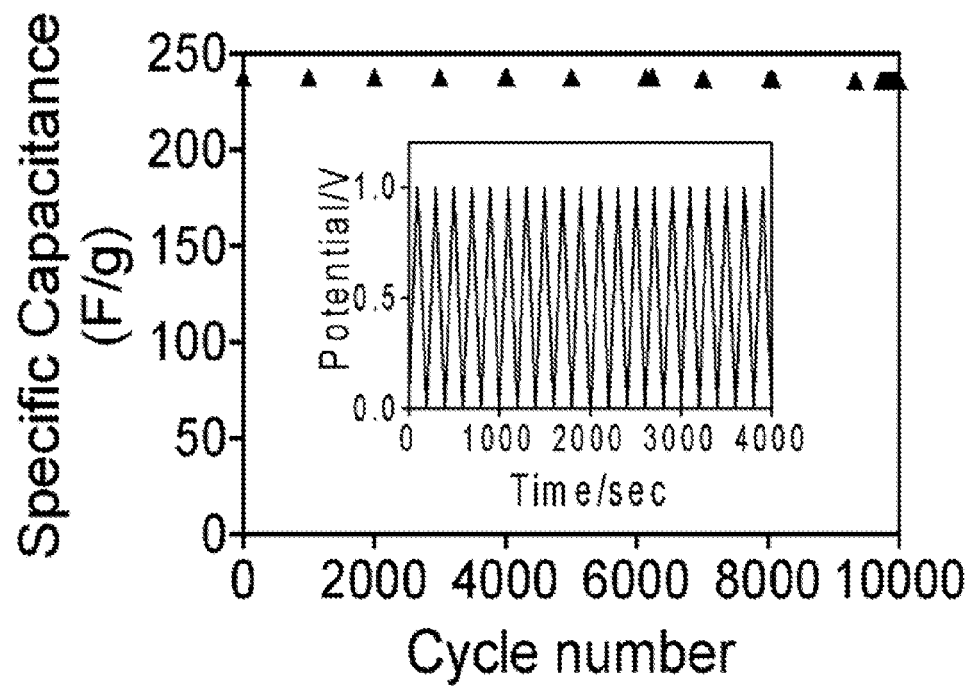
Figure 2D:
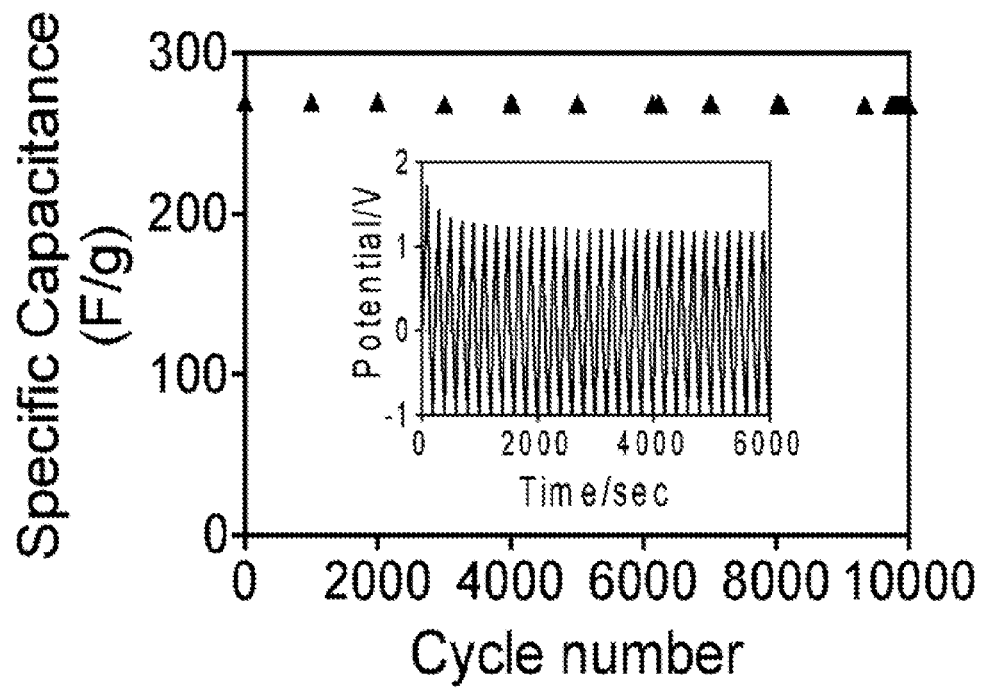
Figure 2E:
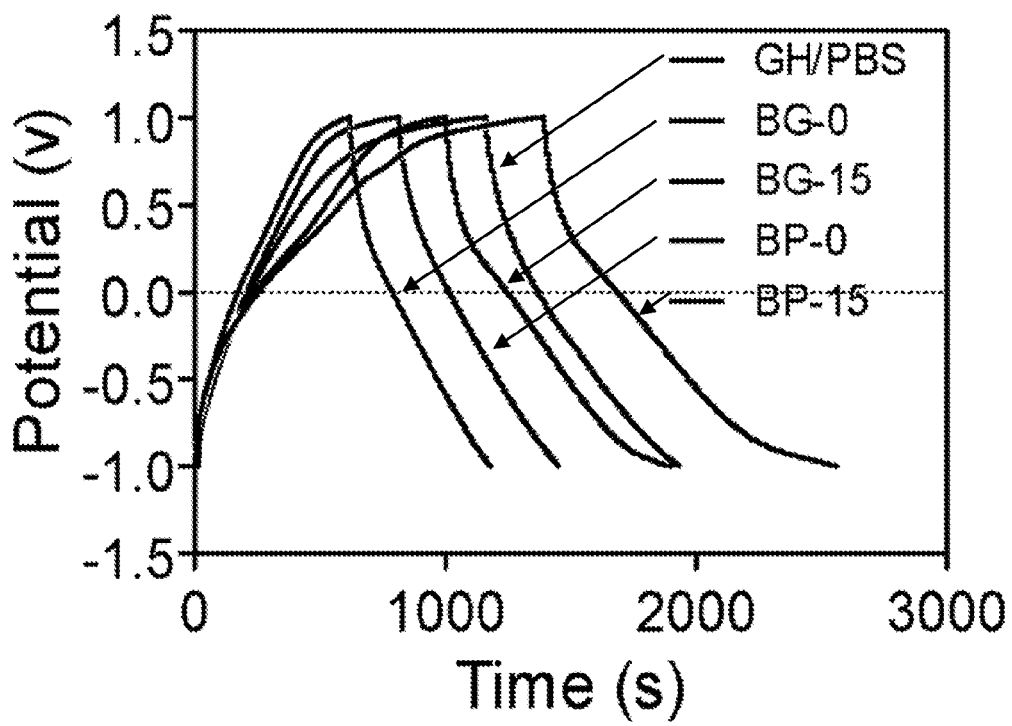
Figure 2F:
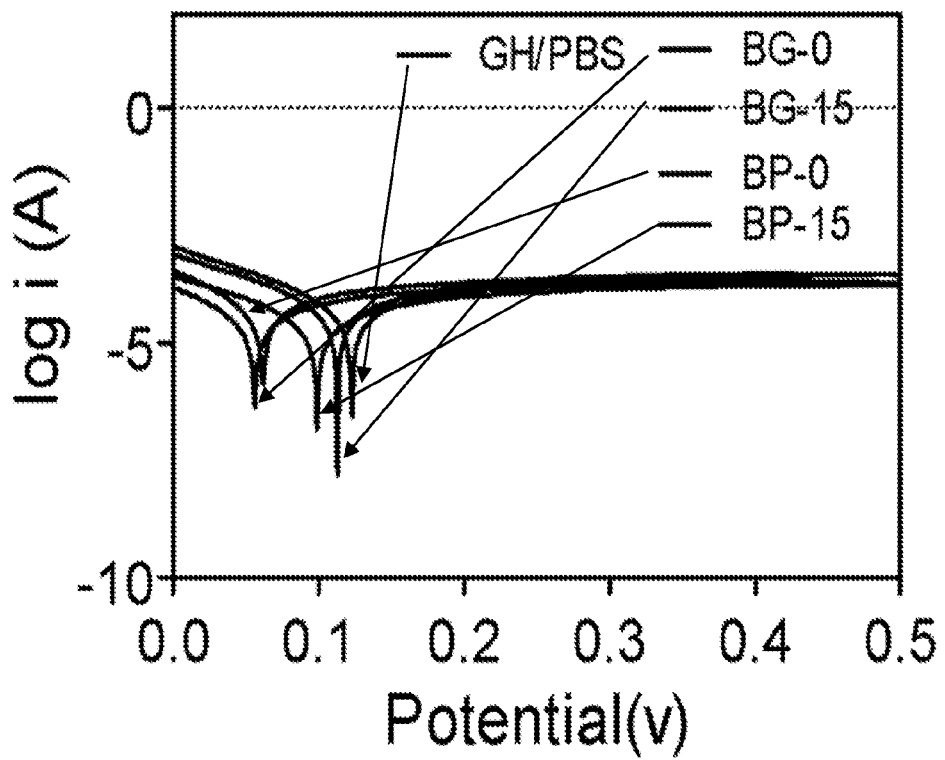
Figure 3A:
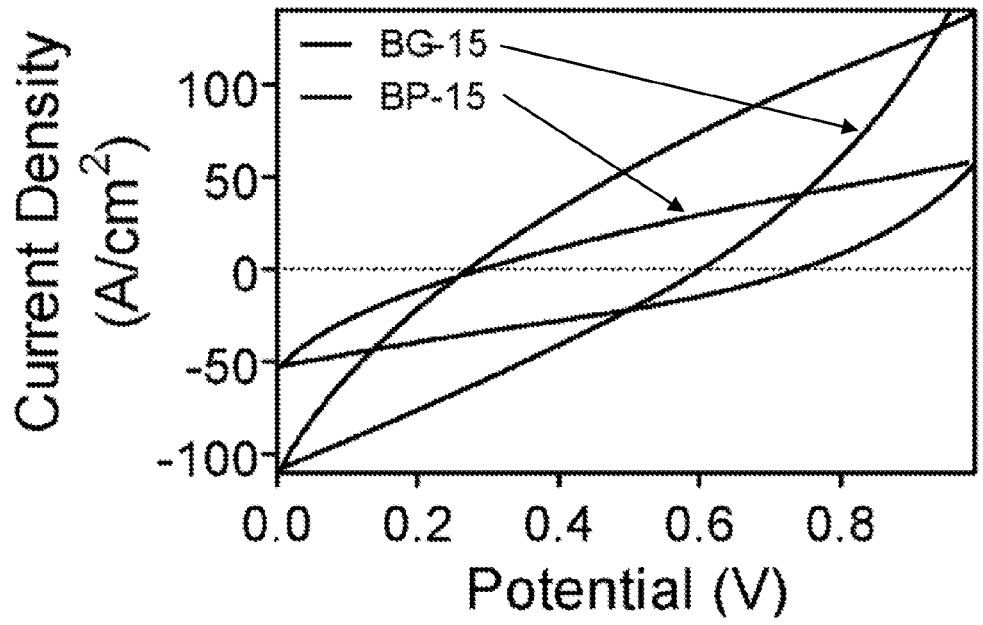
FIGS. 3A-3D are graphs showing CV, volumetric capacitance, performance galvanostatic charge/discharge curve of BG-15 and BP-15.
Figure 3B:
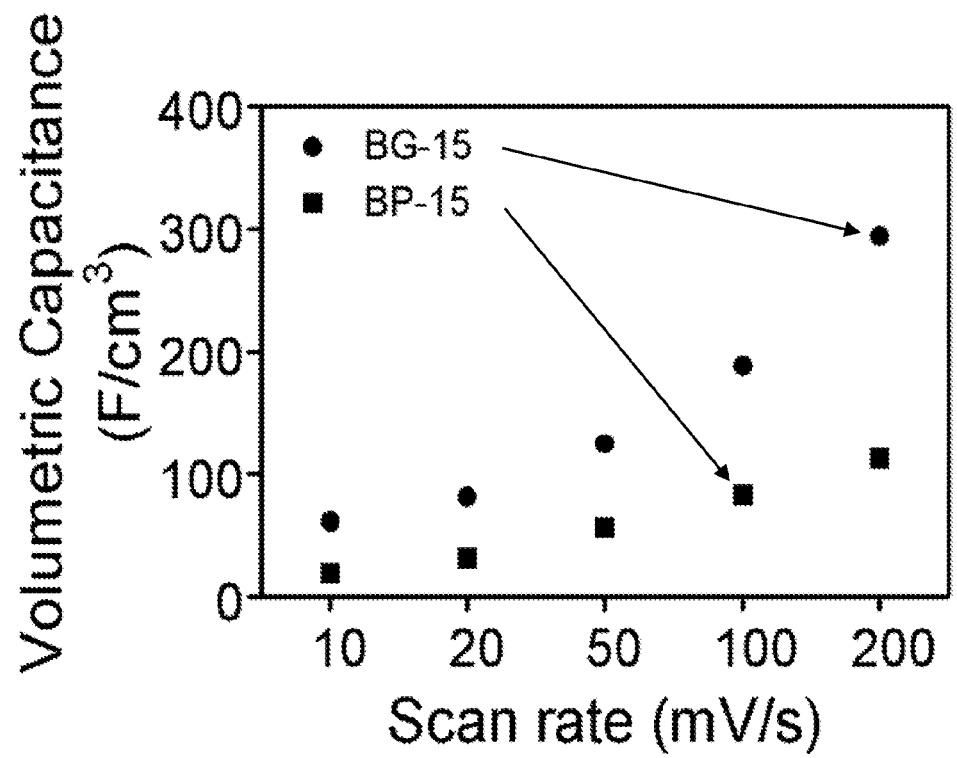
Figure 3C:
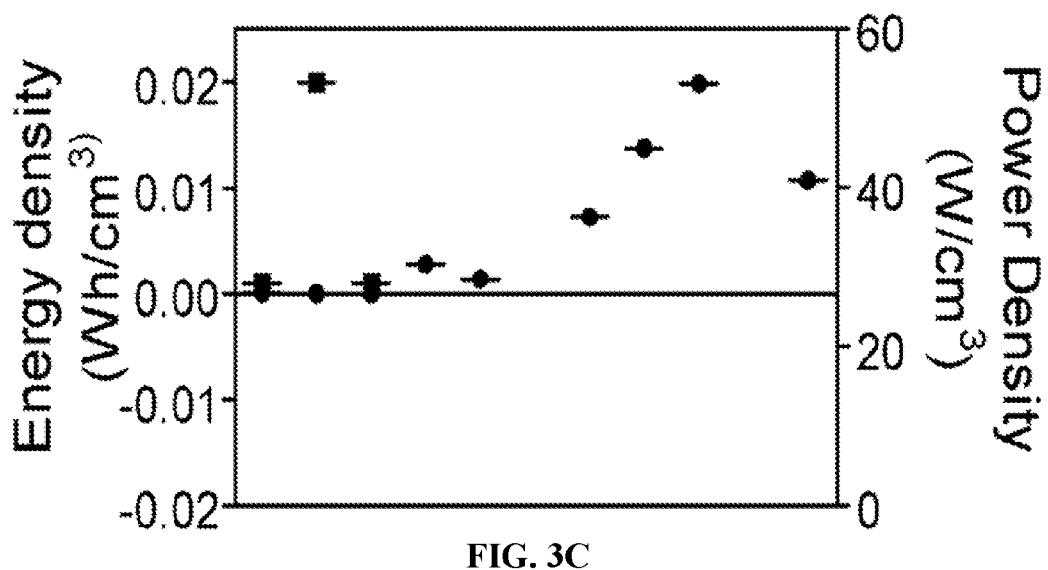
Figure 3D:
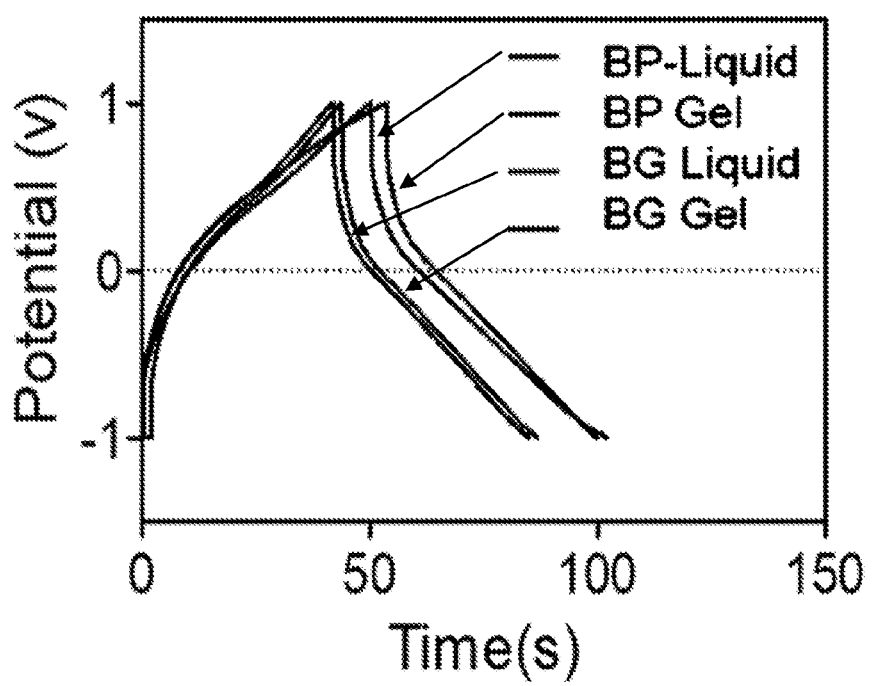
Figure 4A:
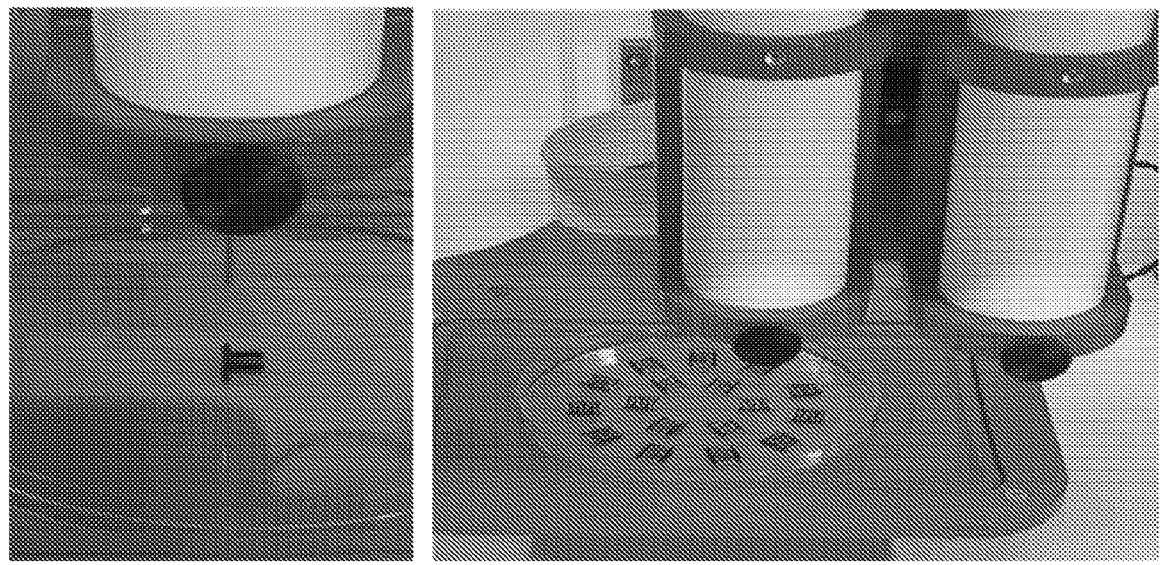
FIGS. 4A-4F illustrate printing of BG-15 electrolyte and GH-L electrode through a 0.51 mm nozzle using ALLEVI2 bioprinter.
Figure 4B:
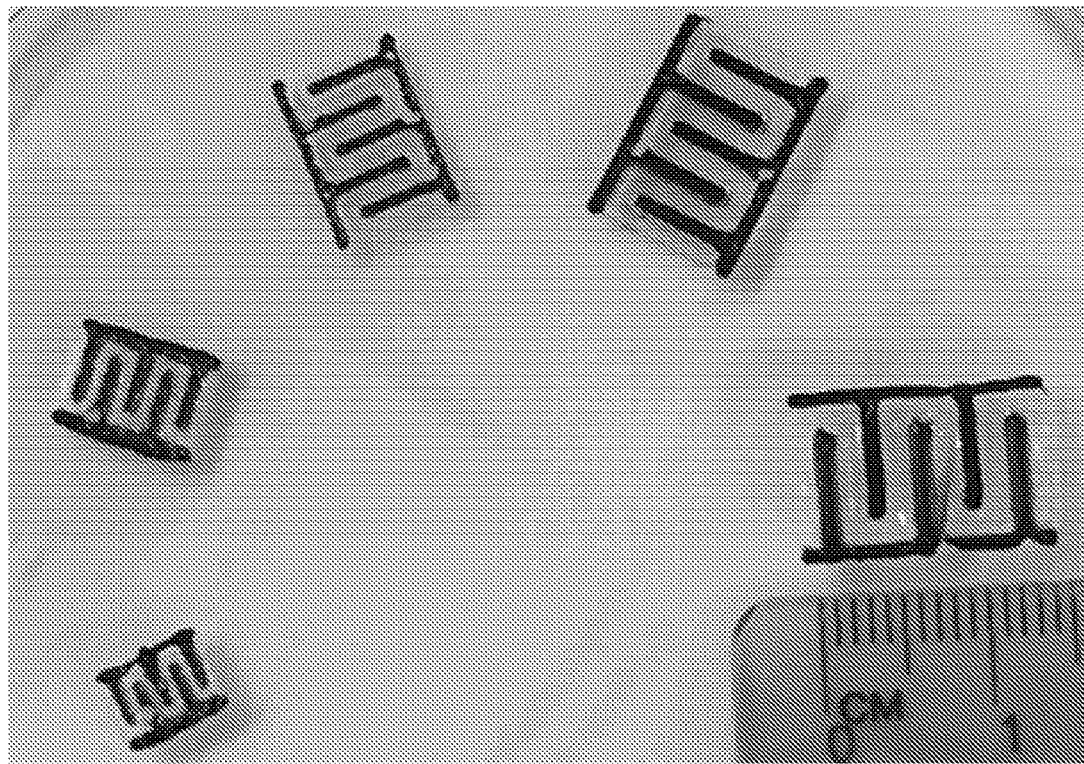
Figure 4C:
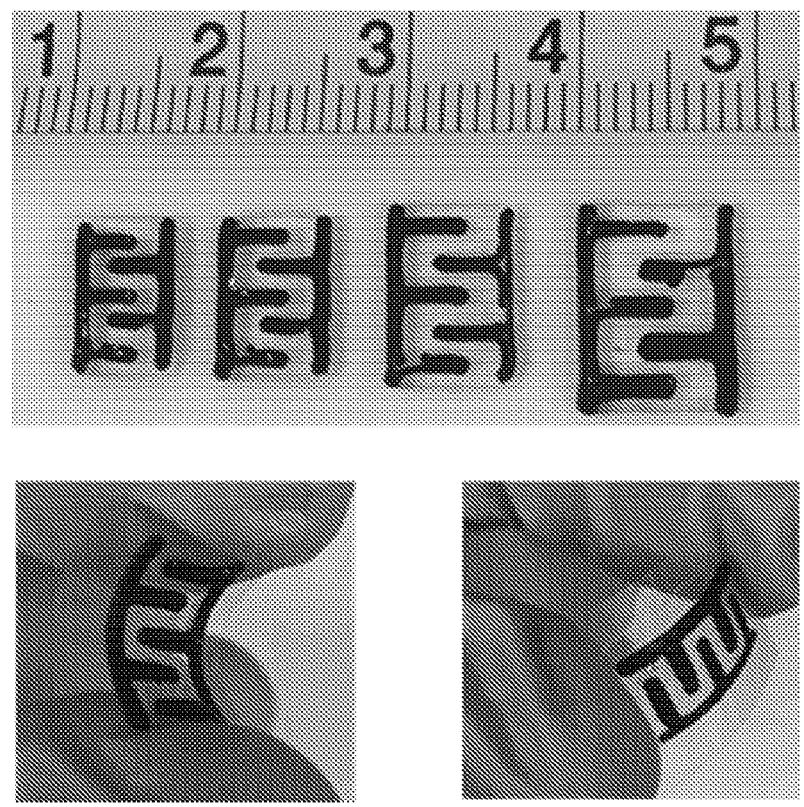
Figure 4D:
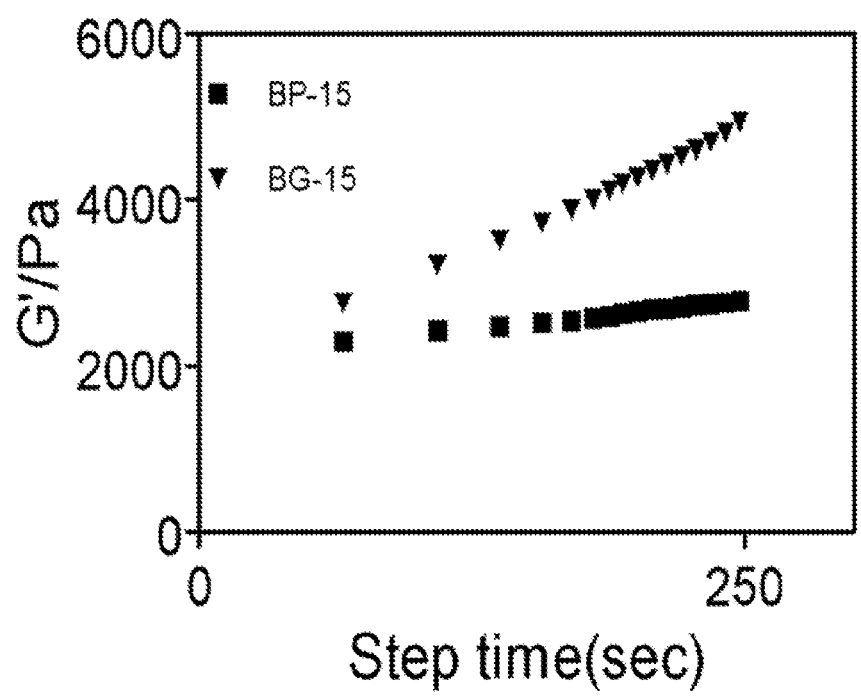
Figure 4E:
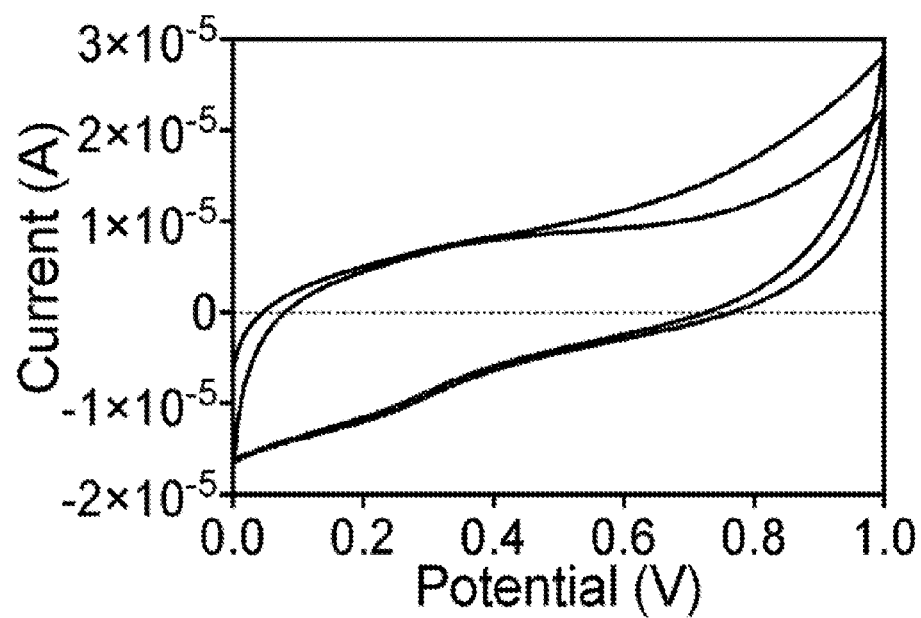
Figure 4F:
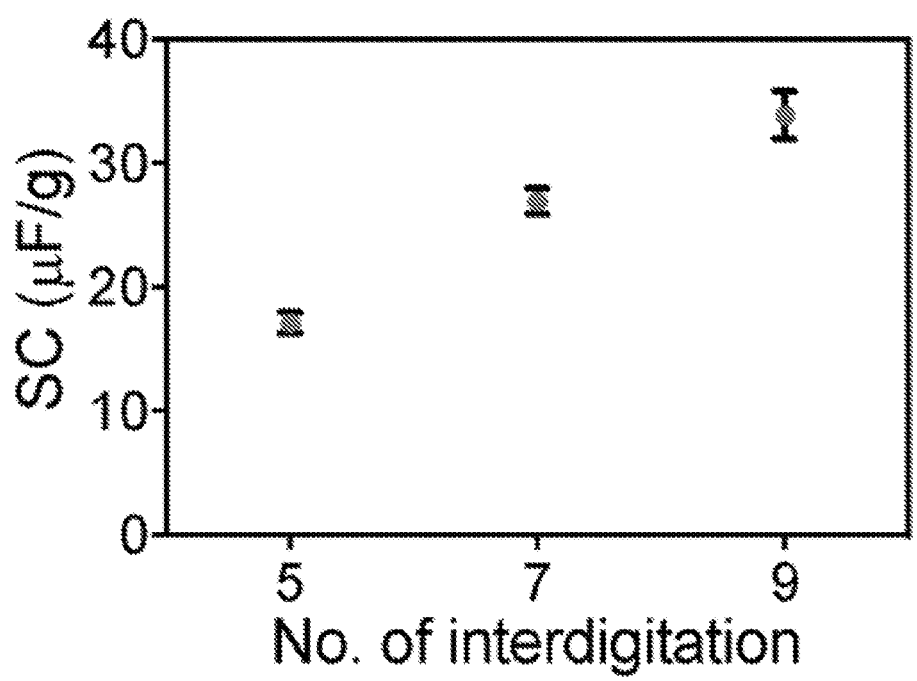
Figure 5E:
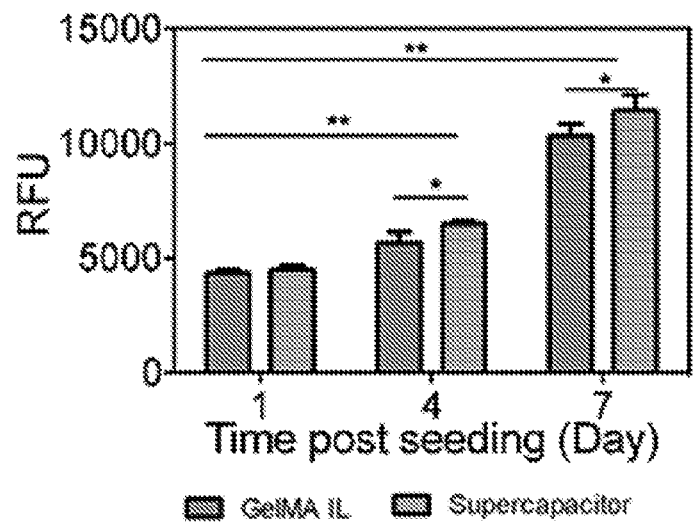
Figure 5F:
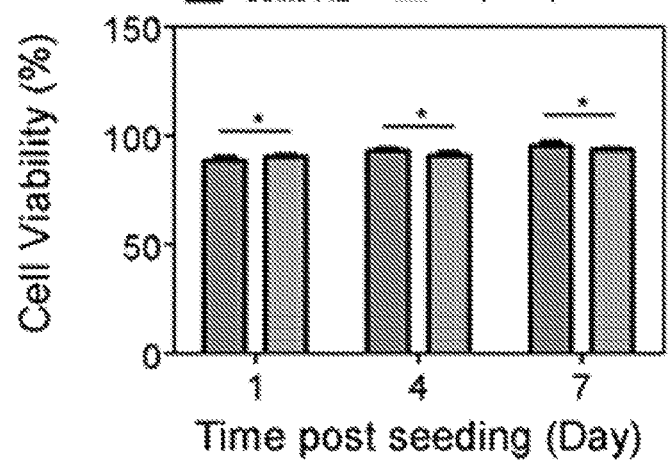
Figure 5G:
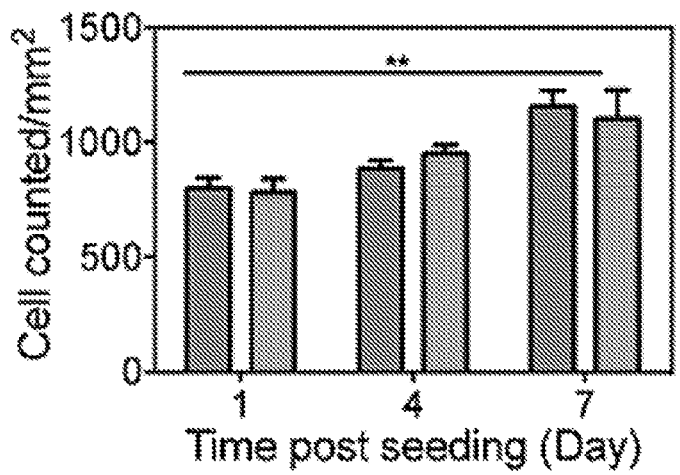

Fabrication method to construct flexible energy storage device with polymer/BIL composite as electrolyte and graphene hydrogel laponite composite as electrode is illustrated in FIG. 4A. In order to form a miniature implantable device, the electrolyte and electrode were 3D printed using ALLEVI 2, extrusion-based printing into different sized interdigitating structure as shown. The printing parameters depend on the rheological properties of the bio-ink (FIG. 13A) The interdigitating structure increases the interaction between the electrode and the electrolyte thus enhancing electrolytic process.

Methods such as micromechanical exfoliation of graphite, chemical vapor deposition, and solution-based chemical reduction can carry out conversion of graphene oxide (GO) to graphene. Chemical reduction of the GO can also be conducted using hydrazine or hydrazine hydrate as the reducing agent (Park, et al., 2011, Carbon 49:3019-3023). However, because hydrazine and hydrazine hydrate are highly poisonous and explosive, they cannot be used for fabricating biocompatible devices. Graphene aerogel has been synthesized using ascorbic acid as reducing agent, L-Ascorbic acid (L-AA), having a mild reductive ability and nontoxic property, is naturally employed as a reducing agent in living things, and has also been used as a primary reductant in the laboratory (Zhang, et al., 2010, Chem. Commun.; doi:10.1039/b917705a). The formation of irreversible graphene agglomerates has been a key problem in the preparation of individual graphene sheets through aqueous solution based chemical reduction of GO.

Laponite is a synthetic clay that consists of disc-like particles, with a diameter of 30 nm and thickness of 1 nm. The laponite disks have a negative charge on the sides and a slightly positive charged on the edges. High solids content liquid dispersions of laponite are especially useful for production of electrically conductive, antistatic and barrier coatings. Thus, the laponite and graphene hydrogel mixture is been used as electrode in order to be able to print. The storage and loss modulus of the mixture favors the printing.

The device can be fabricated into different shapes and sizes thus making it versatile according to the need, the number of interdigitation to check the capacitance of the device was varied in the present invention. The specific capacitance of the printed device with 5 interdigitation being 17.16±0.83 µF/g increases to 33.9±1.9 µF/g with the increase in the interdigitation. Thus, the performance of the printed energy storage device depends on the size of the device. In order to estimate the capacitance retention of the printed device in vivo, the device was explanted after day 4 of implantation and capacitance was measured as 19.90±0.200 µF/g indicating an increase in the capacitance 17.165±0.835 µF/g before implanting.

Example 4

In Vitro Biocompatibility of Polymer/BIL Composite and Energy Storage Device

To investigate the potential of BG-15 and BG-15 conjugated hydrogels to support the growth and spreading in 2D cultures in vitro, a commercial live/dead assay was used to determine the viability of C2C12 cells growing on the surface of GelMA/BIL and fabricated energy storage device, over a period of 7 days. Similarly, cell attachment and spreading on GelMA/BIL hydrogels were evaluated through F-actin/DAPI immunofluorescent staining. The results indicated that the viability of seeded cells on electrolyte and energy storage device was not affected due to the presence of the BIL. Cells seeded on the surface of GelMA/BIL and fabricated device appeared to exhibit 91.6%±1.44% and 91.8%±0.6% cell viability, respectively (FIGS. 5A-5G), at day one post-seeding. Furthermore, the metabolic activity of the primary cultures was shown to increase consistently throughout the duration of the culture, during the day one post seeding were 4467.3±18.5 RFU and 4624.02±44.889 RFU for electrolyte and printed energy storage device, respectively, which increased to 10450.25±414.34 RFU and 11545.14±596.994 RFU as shown indicating the unaffected metabolic activity. In addition, GelMA/BILs hydrogels contained higher cell numbers than the fabricated device at day 7 post-seeding, as shown by quantification of DAPI-stained cell nuclei.

Example 5

In Vivo Biocompatibility and Degradation of Polymer/BIL Composite and Energy Storage Device In vivo compatibility of a conventional electrolyte and energy storage devices is often a limitation and make them undesirable for implantation. These implants could trigger a persistent inflammatory response due to their prolonged half-lives in the organism. In the present invention, in vivo degradation and interactions of BG-15 electrolyte and 3D printed energy storage device with the local tissues were investigated, along with the immunogenicity profile when implanted subcutaneously in vivo in an animal host. Explanted samples, recovered at days 4, 14, and 28 post-implantations (FIGS. 6I-6K) revealed that electrolyte and energy storage device exhibited sustained biodegradation throughout the duration of the 28-day experiment through the H&E staining of the tissue. Also, in the CD68 staining when compared to control and day 4 staining, day 28 showed to cause low levels of inflammation. This observation suggested that the printed device was efficiently degraded in vivo, through enzymatic hydrolysis of the hydrogel matrix. Furthermore, the conjugation of the BIL to different polymers concentration could be used to engineer ECHs with varying degrees of biodegradability.

Example 6

In summary, a miniature high-performance graphene hydrogel and polymer electrolyte-based energy storage device is demonstrated in this invention. The high cycle stability and increased capacitance with the increase of percentage concentration of BILs of the fabricated device can be explained by conductivity of the polymer conjugated ionic liquid electrolyte and highly conductive graphene hydrogel. In one aspect, the hydroxyl group in choline bitartrate reacts with the acrylic acid to form the conductive ionic liquid which upon conjugation with the biocompatible polymer increases the conductivity of the polymer electrolyte. In another aspect, hydrothermal reduction of graphene oxide using ascorbic acid leads to low organic functional group thus increasing the conductivity. In yet another aspect, the interdigitating structure fabricated using 3D printer consisting of the GH electrode and polymer maximizes the accessible surface area of graphene by the electrolyte, which is responsible for the high-charge storage capacity.

The devices were fabricated by 3D printing of reduced GO and laponite mixture as electrode and biocompatible ionic liquid polymer composite as electrolyte. The fabrication process is a versatile stereolithographic additive manufacturing technique; due to the porosity of the electrolyte and high surface area of the electrode, these devices have a high capacitance retention and high power and energy density. To further increase the performance, the number of electrode electrolyte interdigitation can be increased without changing the overall size of the device fabricated (FIGS. 4A-4F). Increased ionic liquid concentration increases the mechanical stability of the electrolyte, thus making it more flexible and easier to fabricate according to the need. Therefore, these biocompatible and degradable miniaturized energy storage devices can be used in applications requiring high cycle stability and high-power density in tissue engineering. In certain embodiments, these electrodes can be fabricated into a solid-state supercapacitor with good capacitive performance and stable cycling stability of up to 10,000 charge/discharge cycles.

The disclosures of each and every patent, patent application, and publication cited herein are hereby incorporated herein by reference in their entirety. While this invention has been disclosed with reference to specific embodiments, it is apparent that other embodiments and variations of this invention can be devised by others skilled in the art without departing from the true spirit and scope of the invention. The appended claims are intended to be construed to include all such embodiments and equivalent variations.

ENUMERATED EMBODIMENTS

The following enumerated embodiments are provided, the numbering of which is not to be construed as designating levels of importance.

Embodiment 1 provides an energy storage device comprising electrodes comprising a graphene gel, wherein at least one of the electrodes is in electrochemical contact with a gel electrolyte comprising a polymer functionalized with a bio-ionic liquid (BIL), wherein the polymer comprises gelatin methacrylate (GelMa) or poly(ethylene glycol) diacrylate (PEGDA).

Embodiment 2 provides the device of Embodiment 1, wherein the BIL comprises choline.

Embodiment 3 provides the device of any of Embodiments 1-2, wherein in the BIL the choline is conjugated with an acrylate or methacrylate group, which forms a covalent group to a methacrylate group on GelMa or an acrylate group in PEGDA.

Embodiment 4 provides the device of any of Embodiments 1-3, wherein the BIL comprises choline acrylate or choline methacrylate.

Embodiment 5 provides the device of any of Embodiments 1-4, wherein the ratio of BIL and polymer in the functionalized polymer is about 1:4 (w/w) to about 4:1 (w/w).

Embodiment 6 provides the device of any of Embodiments 1-5, wherein the ratio of BIL and polymer in the functionalized polymer is about 1:1 (w/w).

Embodiment 7 provides the device of any of Embodiments 1-6, wherein the electrolyte comprises about 10% to about 30% (w/v) polymer.

Embodiment 8 provides the device of any of Embodiments 1-7, wherein the electrolyte comprises about 5% to about 20% (w/v) BIL.

Embodiment 9 provides the device of any of Embodiments 1-8, wherein the electrolyte has porosity ranging from about 10 μm to about 80 μm.

Embodiment 10 provides the device of any of Embodiments 1-9, wherein the electrolyte has a compression modulus of at least about 30 KPa.

Embodiment 11 provides the device of any of Embodiments 1-10, wherein the electrolyte has an elastic modulus of at least about 200 KPa.

Embodiment 12 provides the device of any of Embodiments 1-11, which has a specific capacitance of at least about 150 F/g at a scan rate of about 10 mV/s.

Embodiment 13 provides the device of any of Embodiments 1-12, wherein the electrolyte is electrochemically stable for at least about 10,000 charge-discharge cycles.

Embodiment 14 provides the device of any of Embodiments 1-13, which is biocompatible and/or biodegradable.

Embodiment 15 provides the device of any of Embodiments 1-14, which is biocompatible with a mammal's tissue.

Embodiment 16 provides the device of any of Embodiments 1-15, which is implantable in a mammal in need thereof.

Embodiment 17 provides the device of any of Embodiments 1-16, which is intravascularly implantable in a mammal in need thereof.

Embodiment 18 provides the device of any of Embodiments 1-17, wherein the graphene gel is part of a composite further comprising a clay.

Embodiment 19 provides the device of any of Embodiments 18, wherein the clay comprises laponite.

Embodiment 20 provides the device of any of Embodiments 1-19, wherein the at least one electrode is at least partially interdigitated with another electrode.

Embodiment 21 provides the device of any of Embodiments 1-20, wherein the gel electrolyte and the electrodes are independently printed using extrusion-based 3D printing.

Embodiment 22 provides the device of any of Embodiments 1-21, wherein the graphene gel is a hydrogel.

Embodiment 23 provides the device of any of Embodiments 1-22, wherein the gel electrolyte comprises a hydrogel.

Embodiment 24 provides a method of forming the energy storage device of any of Embodiments 1-23, the method comprising independently printing the gel electrolyte and the electrodes using extrusion-based 3D printing.

Embodiment 25 provides the method of Embodiment 24, further comprising forming the gel electrolyte comprising a polymer functionalized with a bio-ionic liquid (BIL), wherein the polymer comprises gelatin methacrylate (GelMa) or poly(ethylene glycol) diacrylate (PEGDA).

Embodiment 26 provides the method of any of Embodiments 24-25, further comprising forming the electrodes comprising graphene gel.

Embodiment 27 provides the method of any of Embodiments 24-26, wherein forming the gel electrolyte comprises contacting the polymer with the BIL in the presence of at least one photoinitiator.

Embodiment 28 provides the method of Embodiment 27, wherein the at least one photoinitiator is selected from the group consisting of eosin Y, 2-hydroxy-2-methylpropiophenone, 2-methyl-4'-(methylthio)-2-morpholinopropiophenone, lithium phenyl-2,4,6-trimethylbenzoylphosphinate (LAP), 2-hydroxy-4'-(2-hydroxyethoxy)-2-methylpropiophenone (Irgacure) and hydroxymethyl-propiophenone (HEMP).

Embodiment 29 provides the method of any of Embodiments 24-28, wherein the gel electrolyte comprises about 10% to about 20% (w/v) BIL.

Embodiment 30 provides the method of any of Embodiments 24-29, wherein the gel electrolyte comprises about 10% to about 30% (w/v) polymer.

Embodiment 31 provides the method of any of Embodiments 24-30, wherein the gel electrolyte comprises about 1:4 to about 4:1 (w/w) BIL to polymer.

Embodiment 32 provides the method of any of Embodiments 24-31, wherein the gel electrolyte comprises about 1:1 (w/w) BIL to polymer.

Embodiment 33 provides the method of any of Embodiments 27-28, wherein the photoinitiator comprises about 0.5% (w/v) of the gel electrolyte.

Embodiment 34 provides the method of any of Embodiments 24-33, wherein the gel electrolyte further comprises a biocompatible aqueous buffer.

Embodiment 35 provides the method of any of Embodiments 24-34, wherein at least two electrodes are at least partially interdigitated.

What is claimed is:

1. An energy storage device comprising:
   at least one electrode comprising a laponite and graphene hydrogel mixture,
   wherein the at least one electrode is in electrochemical contact with a gel electrolyte,
   wherein the gel electrolyte comprises a polymer functionalized with a bio-ionic liquid (BIL), and
   wherein the polymer comprises gelatin methacrylate (GelMa) or poly(ethylene glycol) diacrylate (PEGDA).

2. The device of claim 1, wherein the BIL comprises choline.

3. The device of claim 2, wherein in the BIL the choline is conjugated with an acrylate or methacrylate group, which is covalently bound to a methacrylate group on GelMa or an acrylate group in PEGDA.

4. The device of claim 3, wherein the BIL comprises choline acrylate or choline methacrylate.

5. The device of claim 1, wherein the ratio of BIL and polymer in the functionalized polymer is about 1:4 (w/w) to about 4:1 (w/w).

6. The device of claim 1, wherein the electrolyte comprises about 10% to about 30% (w/v) polymer.

7. The device of claim 1,
wherein the electrolyte comprises about 5% to about 20% (w/v) BIL or
wherein the electrolyte has a porosity ranging from about 10 μm to about 80 μm.

8. The device of claim 1,
wherein the electrolyte has an elastic modulus of at least about 200 KPa.

9. The device of claim 1, wherein the at least one electrode is at least partially interdigitated with another electrode.

10. The device of claim 1, wherein the at least one electrode consists of a laponite and graphene hydrogel mixture.

11. A method of forming the energy storage device of claim 1, the method comprising independently printing the gel electrolyte and the electrodes using extrusion-based 3D printing.

12. The method of claim 11, wherein forming the gel electrolyte comprises contacting the polymer with the BIL in the presence of at least one photoinitiator.

13. The method of claim 12, wherein the at least one photoinitiator is selected from the group consisting of eosin Y, 2-hydroxy-2-methylpropiophenone, 2-methyl-4'-(methylthio)-2-morpholinopropiophenone, lithium phenyl-2,4,6-trimethylbenzoylphosphinate (LAP), 2-hydroxy-4'-(2-hydroxyethoxy)-2-methylpropiophenone (Irgacure) and hydroxymethyl-propiophenone (HEMP).

14. The method of claim 11,
wherein the gel electrolyte comprises about 10% to about 20% (w/v) BIL or
wherein the gel electrolyte comprises about 10% to about 30% (w/v) polymer.

15. The method of claim 11, wherein the gel electrolyte comprises about 1:4 to about 4:1 (w/w) BIL to polymer.

16. The method of claim 11, wherein the photoinitator comprises about 0.5% (w/v) of the gel electrolyte.

17. The method of claim 11, wherein at least two electrodes are at least partially interdigitated.

* * * * *